United States Patent
Choo et al.

(10) Patent No.: US 10,933,993 B2
(45) Date of Patent: Mar. 2, 2021

(54) UNMANNED AERIAL VEHICLE HAVING PLURALITY OF SERVOMOTORS TO CONTROL WING PARTS

(71) Applicant: LG ELECTRONICS INC., Seoul (KR)

(72) Inventors: Zhimin Choo, Seoul (KR); Seihyun Cho, Seoul (KR); Hyeoncheol Lee, Seoul (KR); Sanghyuck Lee, Seoul (KR); Chulbae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 305 days.

(21) Appl. No.: 16/072,931

(22) PCT Filed: Feb. 5, 2016

(86) PCT No.: PCT/KR2016/001347
§ 371 (c)(1),
(2) Date: Jul. 26, 2018

(87) PCT Pub. No.: WO2017/165485
PCT Pub. Date: Aug. 10, 2017

(65) Prior Publication Data
US 2019/0031345 A1   Jan. 31, 2019

(30) Foreign Application Priority Data
Feb. 3, 2016 (KR) .......................... 10-2016-0013611

(51) Int. Cl.
*B64B 1/40* (2006.01)
*B64C 33/02* (2006.01)
(Continued)

(52) U.S. Cl.
CPC .............. *B64C 39/024* (2013.01); *B64B 1/24* (2013.01); *B64B 1/40* (2013.01); *B64B 1/58* (2013.01);
(Continued)

(58) Field of Classification Search
CPC . B64C 33/02; B64C 33/025; B64C 2201/025; B64B 1/24; A63H 27/008
See application file for complete search history.

(56) References Cited

U.S. PATENT DOCUMENTS 373,469 A * 11/1887 Morgan .................. B64C 33/02
244/72
411,779 A * 10/1889 Borgfeldt ................ B64C 33/02
244/22
(Continued)

FOREIGN PATENT DOCUMENTS

JP     2005-161935 A    6/2005
JP     2009-292329 A   12/2009
(Continued)

*Primary Examiner* — Joseph W Sanderson
(74) *Attorney, Agent, or Firm* — Birch, Stewart, Kolasch & Birch, LLP

(57) ABSTRACT

An unmanned aerial vehicle including a body part having an inner space filled with light gas; and a plurality of wing parts mounted on the body part and providing a propelling force. Each of the wing parts includes a fin part having a first rib and a second rib, a first servomotor and a second servomotor connected to one end of the first rib and one end of the second rib, respectively, to move the other end of the first rib and the other end of the second rib in a control angle range; a control unit for controlling the first servomotor and the second servomotor to make the first rib and the second rib move while having a particular phase difference therebetween; and a third servomotor connected to the first servo-
(Continued)

motor and the second servomotor to rotate the fin part to determine the propelling direction of the body part.

19 Claims, 20 Drawing Sheets

(51) Int. Cl.
*B64B 1/24* (2006.01)
*B64C 39/02* (2006.01)
*B64B 1/58* (2006.01)

(52) U.S. Cl.
CPC ........ *B64C 33/02* (2013.01); *B64C 2201/022* (2013.01); *B64C 2201/025* (2013.01); *B64C 2201/042* (2013.01); *B64C 2201/146* (2013.01)

(56) References Cited

U.S. PATENT DOCUMENTS

| | | | | |
|---|---|---|---|---|
| 1,284,825 A * | 11/1918 | Van Auken | ............ | B64C 33/02 244/22 |
| 1,997,906 A * | 4/1935 | Jelalian | ............ | B64B 1/00 244/28 |
| 3,153,871 A * | 10/1964 | Semba | ............ | A63H 13/02 40/416 |
| 5,288,039 A * | 2/1994 | DeLaurier | ............ | B64C 3/52 244/219 |
| 6,840,477 B2 * | 1/2005 | Hamamoto | ............ | B64C 33/02 244/22 |
| 7,409,266 B2 * | 8/2008 | Hara | ............ | B64C 33/025 700/245 |
| 7,410,121 B2 * | 8/2008 | Dainys | ............ | B64C 33/025 244/11 |
| 10,273,001 B2 * | 4/2019 | Cantrell | ............ | B64C 39/024 |
| 2002/0117583 A1 * | 8/2002 | Hamamoto | ............ | B64C 33/02 244/72 |
| 2007/0029441 A1 * | 2/2007 | Dainys | ............ | B64C 33/025 244/72 |
| 2008/0272231 A1 * | 11/2008 | Sinclair | ............ | A63H 27/008 244/72 |
| 2015/0307191 A1 * | 10/2015 | Samuel | ............ | B64C 39/024 244/22 |
| 2015/0341540 A1 * | 11/2015 | Kim | ............ | G05D 1/0094 348/144 |
| 2018/0072414 A1 * | 3/2018 | Cantrell | ............ | B64C 39/024 |

FOREIGN PATENT DOCUMENTS

| | | | | |
|---|---|---|---|---|
| JP | 2016-005944 A | 1/2016 | | |
| KR | 10-2014-0102433 A | 8/2014 | | |
| KR | 10-2015-0134591 A | 12/2015 | | |
| WO | WO-2019042238 A1 * | 3/2019 | ............... | B64B 1/44 |

* cited by examiner (a)

(b)

UNMANNED AERIAL VEHICLE HAVING PLURALITY OF SERVOMOTORS TO CONTROL WING PARTS

CROSS REFERENCE TO RELATED APPLICATIONS

This application is the National Phase of PCT International Application No. PCT/KR2016/001347, filed on Feb. 5, 2016, which claims priority under 35 U.S.C. 119(a) to Patent Application No. 10-2016-0013611, filed in the Republic of Korea on Feb. 3, 2016, all of which are hereby expressly incorporated by reference into the present application.

TECHNICAL FIELD

The present invention relates to an unmanned aerial vehicle flying over the ground.

BACKGROUND ART

An unmanned aerial vehicle which is an aircraft without a human pilot on board, and which has a relatively small body. The unmanned aerial vehicle has a variety of functions such as image capturing, low-altitude reconnaissance search, and the like that can be performed, and has recently been applied to various fields. The unmanned aerial vehicle can be remotely controlled and controlled to perform functions at desired sections.

In recent years, unmanned aerial vehicles have been developed which have a light body and perform functions while flying at low speed in a room. Such unmanned aerial vehicles float in the air due to buoyancy of their main bodies filled with light gas, and require a different flying structure from typical unmanned aircrafts because they have to fly at a position desired by a user.

DETAILED DESCRIPTION OF THE DISCLOSURE

An aspect of the present invention is to provide an unmanned aerial vehicle capable of floating above the ground using a wing module allowing a low-speed flight.

To achieve the aspect and other advantages of the present invention, there is provided an unmanned aerial vehicle, including a body part having an inner space filled with particular gas, and a plurality of wing parts mounted on the body part to provide a propelling force, wherein each of the plurality of wing parts includes a fin portion having first and second ribs mounted thereon, first and second servomotors connected to one end of the first rib and one end of the second rib, respectively, to move another end of the first rib and another end of the second rib within a preset control angle range, a control unit to control the first and second servomotors so that the first and second ribs move while having a predetermined phase difference therebetween, and a third servomotor connected to the first and second servomotors to rotate the fin portion to decide a propelling direction of the body part.

As one example related to the present invention, the control unit may rotate the fin portion by a limit angle of the third servomotor when a phase shift direction of the first and second ribs is a first direction, and control the third servomotor such that the fin portion rotates in a direction horizontal to the propelling direction, so as to control a backward movement of the unmanned aerial vehicle. Therefore, the unmanned aerial vehicle can be controlled to move forward and backward according to the change in the angle of the fin portion and thus does not need an additional driving structure.

As one example related to the present invention, the unmanned aerial vehicle may further include a sensor unit including at least one of a distance sensor for detecting a distance from an external object, an inertial measurement unit (IMU) sensor for detecting a movement, and a position sensor for detecting a position of the body part. Accordingly, the unmanned aerial vehicle can fly along a safe route according to the change in the detected position.

EFFECT OF THE DISCLOSURE

According to the present invention, wing parts mounted on a body part are controlled such that a fin portion can be flapped by two servomotors while having a phase difference. Therefore, an unmanned aerial vehicle floating in the air can fly safely and mutual damage of the unmanned aerial vehicle and an object can be minimized even when the unmanned aerial vehicle collides against the object.

Further, by use a fixed support unit which is mounted on a main body of the body part while occupying a large area so as to fix the wing parts, the wing parts can be stably fixed to the body part made of a light material.

In addition, a flight direction can be easily changed by a servomotor that adjusts an angle of the fin portion, so that the flight can be controlled in a desired direction by only wing-flaps of the fin portion without an additional component.

BEST MODE OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
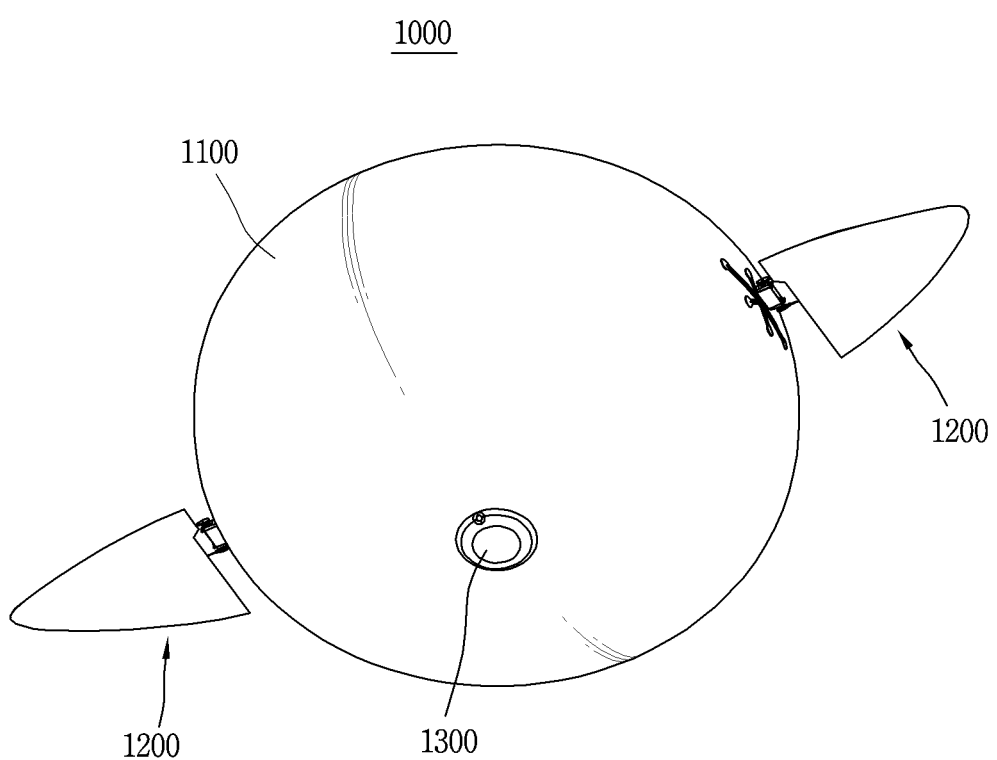
FIG. 1 is a view of an unmanned aerial vehicle in accordance with one embodiment of the present invention, viewed from one direction.

FIG. 1 is a view of an unmanned aerial vehicle in accordance with one embodiment of the present invention, viewed from one direction.

Referring to FIG. 1, an unmanned aerial vehicle 1000 includes a body part 1100, a wing part 1200, and an electronic module part 1300. The body part 1100 of the unmanned aerial vehicle 1000 may have a spherical shape or an elliptical spherical shape. The body part 1100 forms an inner space, in which specific type of gas is filled. The specific type of gas is light gas so that the body part 1100 can float in the air. For example, the inside of the body part 1100 may be filled with helium gas. The body part 1100 may be made of a relatively light material.

The unmanned aerial vehicle 1000 includes a pair of wing parts 1200 mounted on both sides of the body part 1000. The wing parts 1200 are preferably disposed on symmetrical regions on the body part 1000, but the present invention is not limited thereto. The wing part 1200 is provided in plurality and the plurality of wing parts 1200 is arranged in a manner that the body part 1000 is disposed to be horizontal. Each of the wing parts 1200 includes a fin portion for swinging (stirring) air in the sky, and a plurality of motors for moving the fin portion. In response to a relative movement of the fin portion, the body part 1000 can move forward or backward, or rotate while floating above the ground, and also move vertically while moving in a specific direction. The structure of the wing part 1200 will be described in detail later with reference to FIGS. 2A to 2C.

The electronic module part 1300 is disposed on a lower portion of the body part 1100 in a floating state of the body part 1100. For example, the electronic module part 1300 may include at least one of a camera, a battery, a controller, and a speaker. The camera 1300 may be controlled to capture (photograph) the ground while the body part 1100 floats above the ground. The electronic module part 1300 may include a wireless communication unit to transmit and receive wireless signals with an external device or an external communication system, such that a flight can be controlled by an external user.

The camera, the speaker and the like included in the electronic module part 1300 may be controlled to operate based on a state where the operation of the wing part 1200 is limited, when the unmanned aerial vehicle 1000 is flying or is located at a specific height.

In this specification, a region where the electronic module part 1300 of the unmanned aerial vehicle 1000 is mounted is defined as a lower portion, a region facing the lower portion as an upper portion, and the other region as a side portion.

Figure 2A:
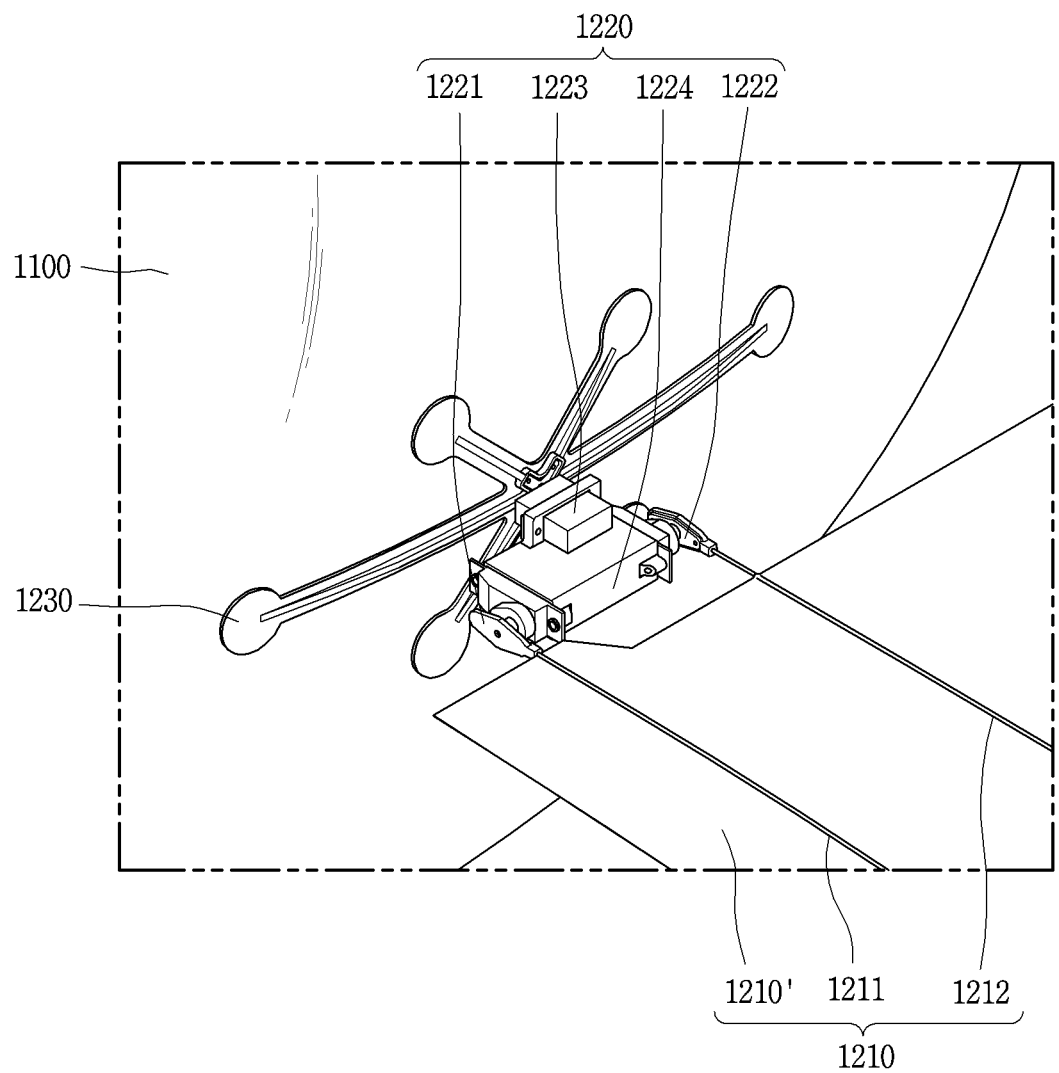
FIG. 2A is a partially-enlarged view of FIG. 1 for illustrating a wing part.
Figure 2B:
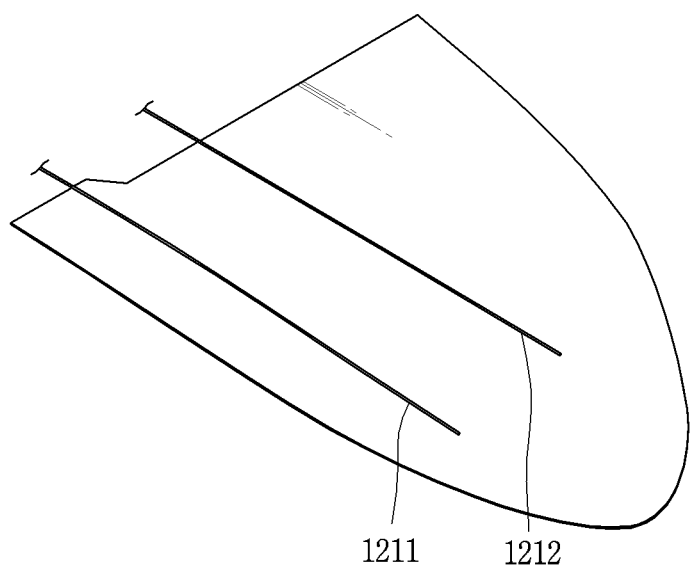
FIG. 2B is a conceptual view illustrating a shape of a fin portion.

FIG. 2A is a partially-enlarged view of FIG. 1 for illustrating the wing part, and FIG. 2B is a conceptual view illustrating a shape of a fin portion.

Referring to FIG. 2A, the wing parts 1200 are mounted on the exterior of the body part 1100. Each of the wing parts 1200 includes a wing 1210, a motor unit 1220 for moving the wing 1210, and a fixed support unit 1230 for fixing the motor unit 1220 to the body part 1100.

The wing 1210 includes a fin portion 1210' and first and second ribs 1211 and 1212 for supporting the fin portion 1210'. The fin portion 1210' is connected to the motor unit 1220 by the first and second ribs 1211 and 1212. The first and second ribs 1211 and 1212 extend in one direction with being spaced apart from each other. The first and second ribs 1211 and 1212 are connected to the motor unit 1220 in a parallel state. The fin portion 1210' extends in the one direction and has a specific shape. Referring to FIG. 2B, if the fin portion 1210' is divided into first and second regions A and B adjacent to the first and second ribs 1211 and 1212, respectively, the first region A may be narrower than the second region B. The first region A is located to face the front of the unmanned aerial vehicle 1000 and a forward movement of the unmanned aerial vehicle 1000 is defined as a movement while the first region A is disposed toward the front. The shape and size of the fin portion 1210' are not limited to those illustrated in the drawings. The first and second ribs 1211 and 1212 may be fixed with being biased to one side from the center of the fin portion 1210'.

The motor unit 1220 includes first to third servomotors 1221, 1222 and 1223 and a control unit 1224 for controlling the first to third servomotors 1221, 1222 and 1223. The first and second servomotors 1221 and 1222 are mounted on both sides of the control unit 1224 and the third servomotor 1223 is mounted on the center of the control unit 1224. The third servomotor 1223 is mounted on the body part 1100 by the fixed support unit 1230.

The fixed support unit 1230 may be formed in a curved shape. The fixed support unit 1230 may be a plurality of fixing ribs which allow the motor unit 1220 to be mounted on an outer surface of the body part 1100 made of a light material. The plurality of fixing ribs extends from a center portion where the third servomotor 1223 is fixed by preset lengths in different directions. The plurality of fixing ribs is fixedly attached to the outer surface of the body part 1100. However, the structure in which the motor unit 1200 is fixed to the body part 1100 is not limited thereto. For example, the body part 1100 may include a fixing groove for fixing the motor unit 1200, and one region of the fixed support unit 1230 may be inserted into the fixing groove.

A mounting structure for mounting the third servomotor 1223 may be formed at a center portion of the plurality of fixing ribs. A connecting portion for electrically connecting the controller of the unmanned aerial vehicle 1000 to the control unit 1224 is formed through the center portion of the fixing ribs. That is, the motor unit 1220 is connected to the body part 1100 structurally and electrically by the fixed support unit 1230.

One end of the first rib 1211 and one end of the second rib 1212 are connected to the first and second servomotors 1221 and 1222, respectively. In a default state, the fin portion 1210' may be disposed in parallel with a horizontal state of the body part 1100. In this case, the first and second ribs 1211 and 1212 are held parallel to the horizontal state of the body part 1100. The first and second ribs 1211 and 1212 perform a vertical (perpendicular) motion by the first and second servomotors 1221 and 1222 based on the horizontal state, and the control unit 1224 is moved by the third servomotor 1223 so that the fin portion 1210' forms an angle with respect to the horizontal state. The first servomotor 1221 is a leading servomotor, the second servomotor 1222 is a trail servomotor, and the third servomotor 1223 is a tilting servomotor.

A propelling force (thrust or propulsive force) is generated by the movement of the both wing parts 1200 by the first to third servomotors 1221, 1222, and 1223. In the unmanned aerial vehicle 1000 according to the present invention, the angle of the fin portion 1210' is changed by a phase difference between the first and second ribs 1211 and 1212, and the propelling force is generated accordingly. Hereinafter, a method of operating the wing parts according to one embodiment of the present invention will be described.

Figure 3A:
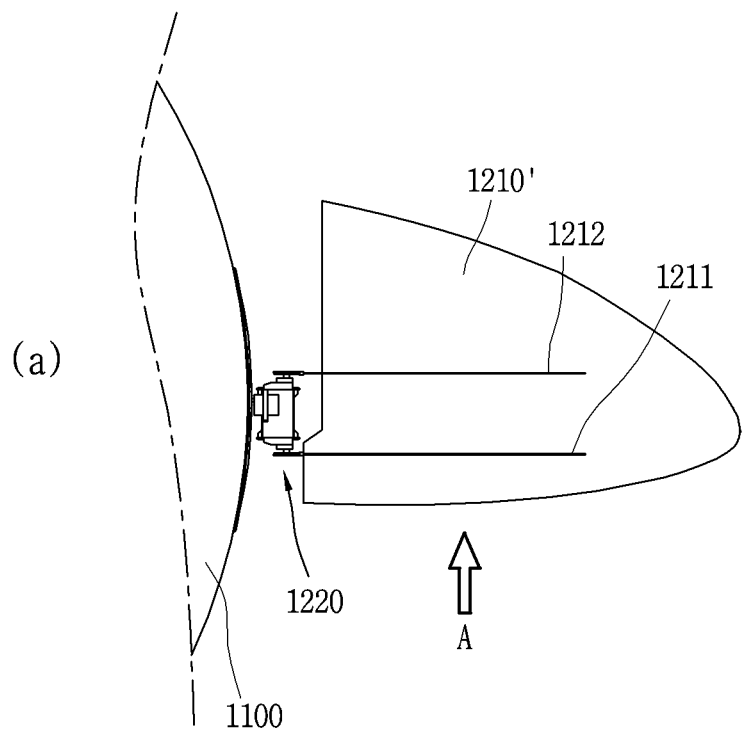
FIGS. 3A to 3D are conceptual views illustrating an operating method of a wing part.
Figure 3A:
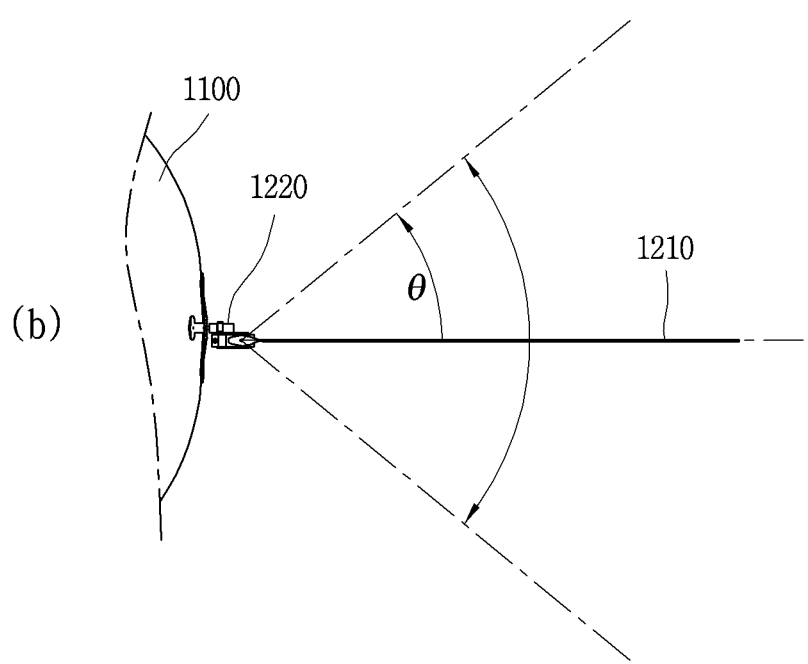
Figure 3B:
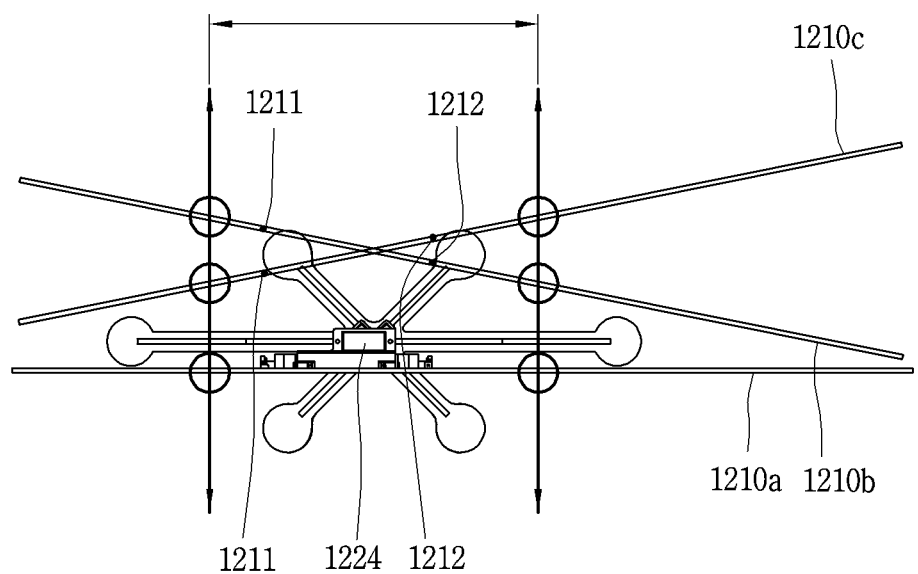
Figure 3C:
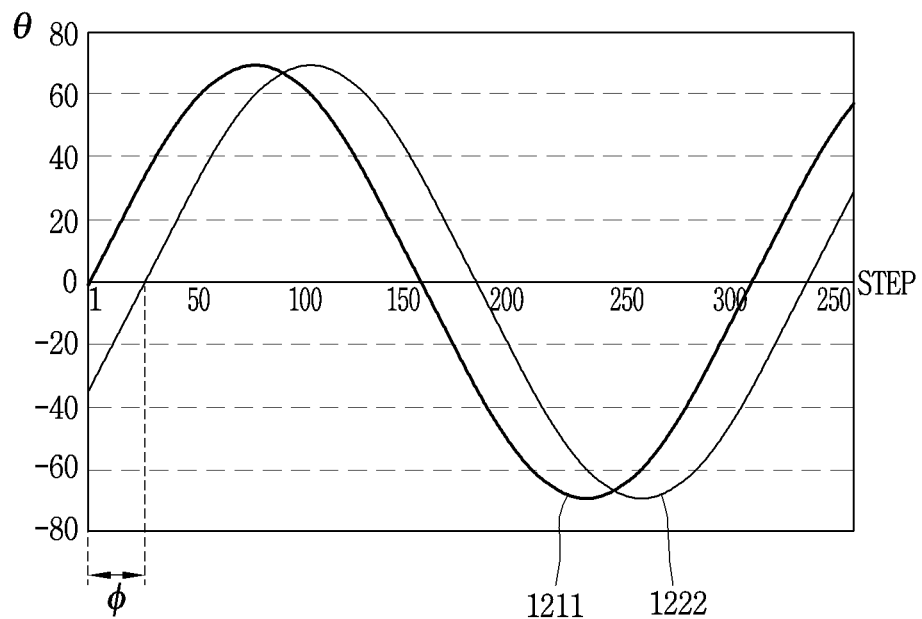

FIGS. 3A and 3C are conceptual views illustrating a method of operating a wing part.

(a) of FIG. 3A shows a view of one wing part 1200 viewed from a top of the unmanned aerial vehicle 1000, and (b) of FIG. 3A shows a view of (a) of FIG. 3A viewed from a direction A. In a default state, the fin portion 1210' and the first and second ribs 1211 and 1212 are arranged in parallel. When viewed from the direction A, the fin portion 1210' and the first and second ribs 1211 and 1212 are arranged on the same line.

Referring to FIG. 3B, in a default state, the wing part 1210 is in a first state 1210a. The first state 1210a is disposed parallel to an x-axis. The fin portion 1210' is in a second state 1210b by the first and second servomotors 1221 and 1222 and the first and second ribs 1211 and 1212 are positioned at different heights. Distances from the fin portion 1210' of the first state to the first and second ribs 1211 and 1212 are different from each other, and the first rib 1211 is located higher than the second rib 121 such that the front of the fin portion 1210' is tilted to be high. The first and second ribs 1211 and 1212 are spaced apart from each other by a preset distance L, and thus the fin portion 1210' of the second state 1210b is arranged to form an angle with the fin portion 1210' of the first state 1210a by the phase difference between the first and second ribs 1211 and 1212.

On the other hand, the fin portion 1210' of a third state 1210c is tilted so that the rear of the fin portion 1210' adjacent to the second rib 1212 is higher. In this case, the position of the second rib 1212 is higher than the position of the first rib 1211. The second and third states 1210b and 1210c are positioned higher than the first state 1210a with respect to the control unit 1224.

The first to third servomotors 1221, 1222, and 1223 are driven so that ends of the first and second ribs 1211 and 1212 move along a y-axis. The first to third servomotors 1221, 1222 and 1223 are independently driven and the first and second servomotors 1221 and 1222 move the first and second ribs 1211 and 121 while having a phase difference therebetween.

Referring to FIG. 3C, the first and second servomotors 1221 and 1222 change the control angle with a phase difference φ. Change periods of the control angle by the first and second servomotors 1221 and 1222 are substantially equal to each other and are driven to form a sine wave.

Figure 3D:
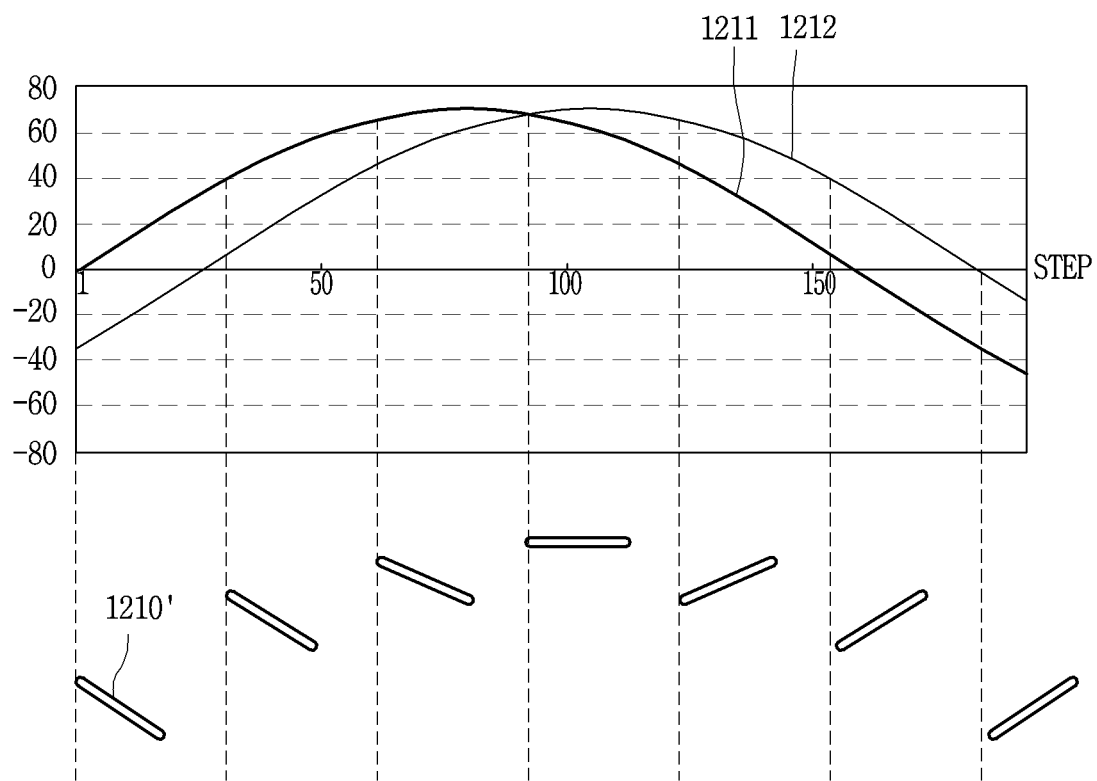

FIG. 3D is a conceptual view illustrating the movement of the fin portion 1210' at a time point corresponding to one region of FIG. 3C. The fin portion 1210' is tilted to the right when the first rib 1211 is positioned higher than the second rib 1212, and is in a horizontal state when the first and second ribs 1211 and 1212 are at the same position. Then, the fin portion 1210' is maintained in a tilted state to the left when the second rib 1212 is positioned higher than the first rib 1211. While the fin portion 1210' is relatively tilted by the first and second ribs 1211 and 1212, the angle of the fin portion 1210' is totally changed in a rotating manner. Accordingly, a propelling direction is changed. In a graph of FIG. 3D, the left side corresponds to the propelling direction (forward) and the right side corresponds to a rear side, and a propelling force applied forward is generated by the movement of the fin portion 1210'.

Figure 4A:
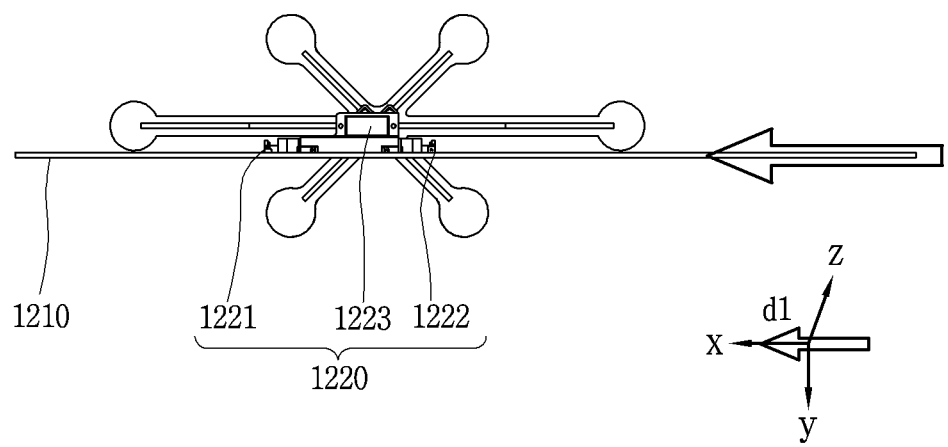
FIGS. 4A to 4C are conceptual views illustrating a control method of changing a propelling (flying, advancing, thrust) direction of an unmanned aerial vehicle.
Figure 4B:
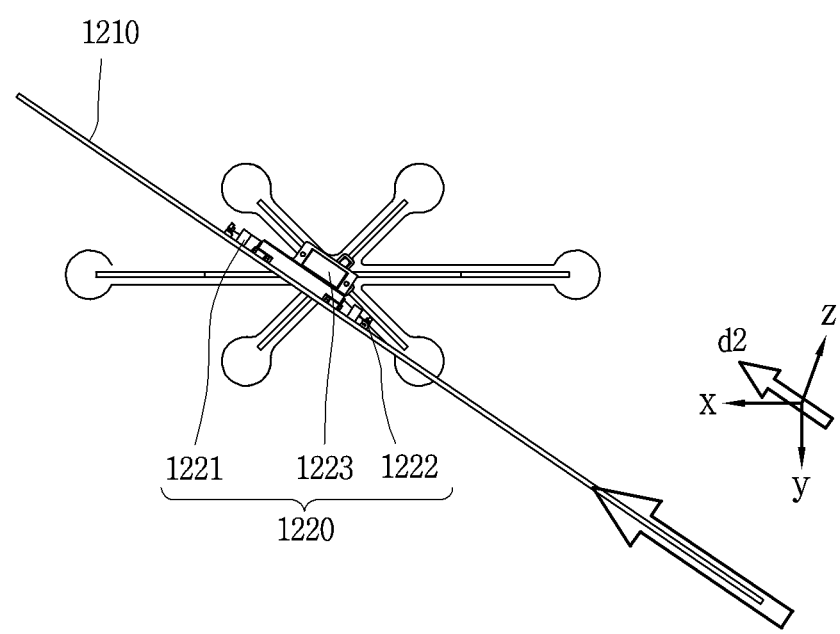
Figure 4C:
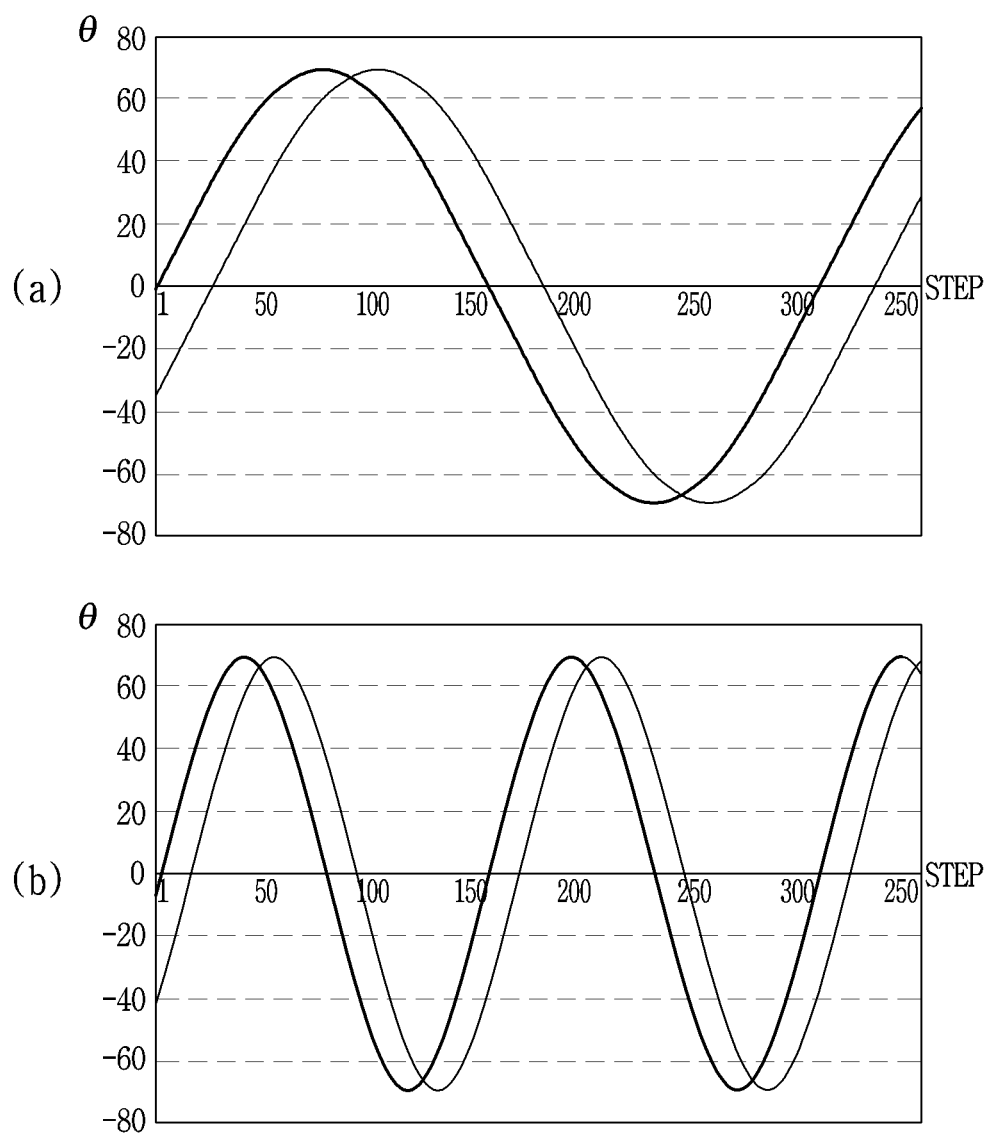

FIGS. 4A to 4C are conceptual views illustrating a control method of changing a propelling (flying, advancing, thrust) direction of an unmanned aerial vehicle. Hereinafter, description will be given of a method of controlling the propelling direction of the wing part 1200 in a state where there is no angle between the first and second ribs 1211 and 1212, with reference to FIGS. 4A and 4B.

Referring to FIG. 4A, when there is no angle difference between the first and second ribs 1211 and 1212 and the fin portion 1210' is disposed in parallel with the x-axis, a first propelling direction d1 is in parallel with an x-axial direction.

Meanwhile, the third servomotor 1223 rotates the control unit 1224 in a z-axial direction as an axis. The rotation of the control unit 1224 causes the fin portion 1210' to be tilted. For example, when the fin portion 1210' is tilted by 30° with respect to the x-axis, the propelling direction of the wing part 1200 may correspond to a second direction d2 moved by 30° with respect to the x-axis. When a propelling force is generated in the second direction d2 while the unmanned aerial vehicle is floating in parallel with the horizontal state, the unmanned aerial vehicle 1000 moves forward while flying up at about 30°.

Accordingly, the control unit 1224 controls the third servomotor 1223 so that the fin portion 1210' rotates in the same direction as the propelling direction based on a control command for changing the movement direction, and operates the first and second servomotors 1221 and 1222.

FIG. 4C is a graph illustrating a control method for controlling a propelling force.

Referring to (a) and (b) of FIG. 4C, (b) of FIG. 4C shows that a motion period (a wing-flap speed) of the fin portion 1210' and an angle adjustment width (a wing-flap degree) of the first and second servomotors 1221 and 1222 are great, and a phase difference between the two servomotors is small. Accordingly, the wing part 1200 flaps more greatly at faster speed, and the phase difference of motion between the first and second ribs 1211 and 1212 is correspondingly reduced. In this case, the propelling force in (c) of (b) of FIG. 4C is greater than the propelling force in (a) of FIG. 4C.

That is, the control unit 1224 can change the magnitude of the propelling force for moving the unmanned aerial vehicle 1000 by controlling the motion period and a motion width of the first and second servomotors 1221 and 1222.

Figure 5A:
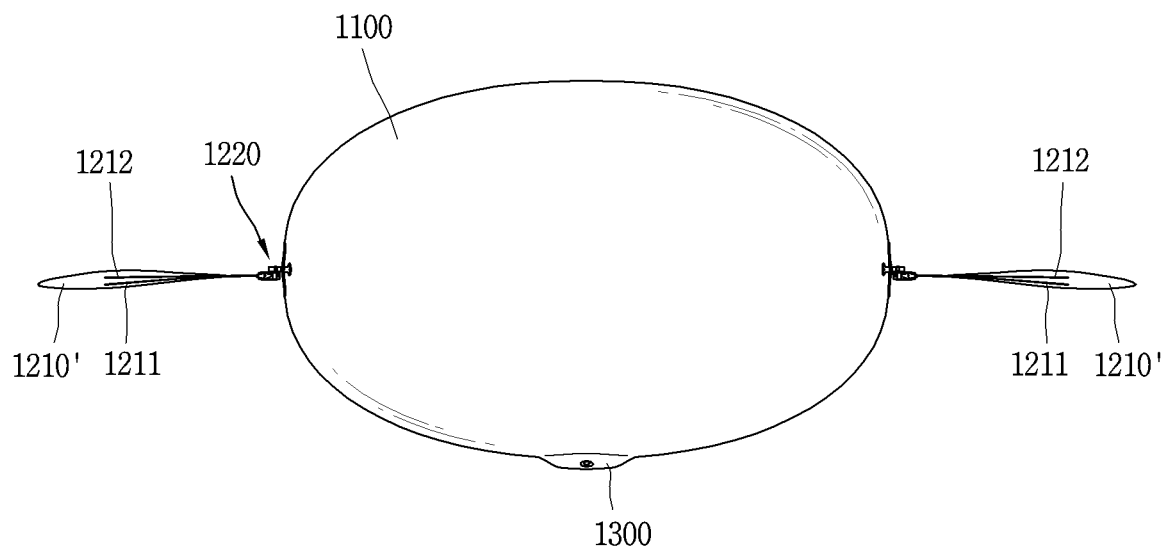
FIGS. 5A to 5C are conceptual views illustrating an operation of a wing part of an unmanned aerial vehicle moving forward.
Figure 5B:
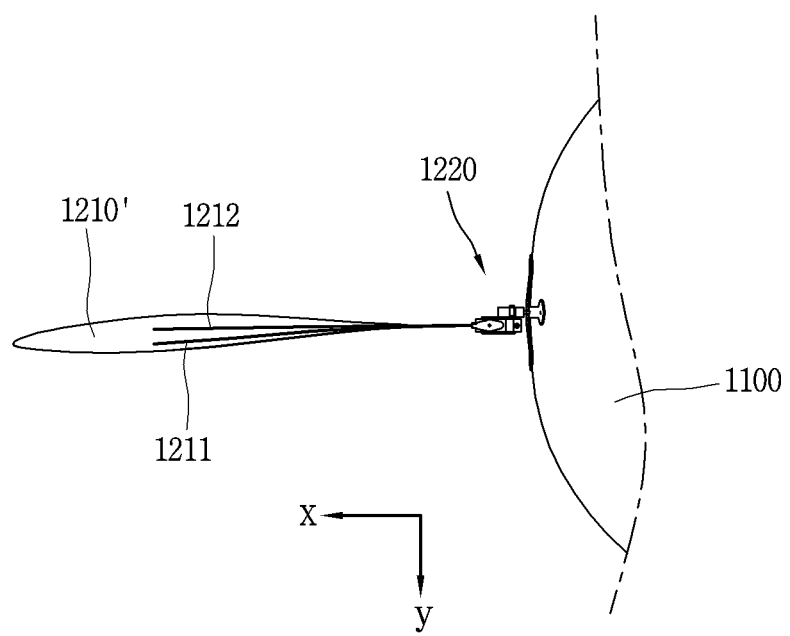
Figure 5C:
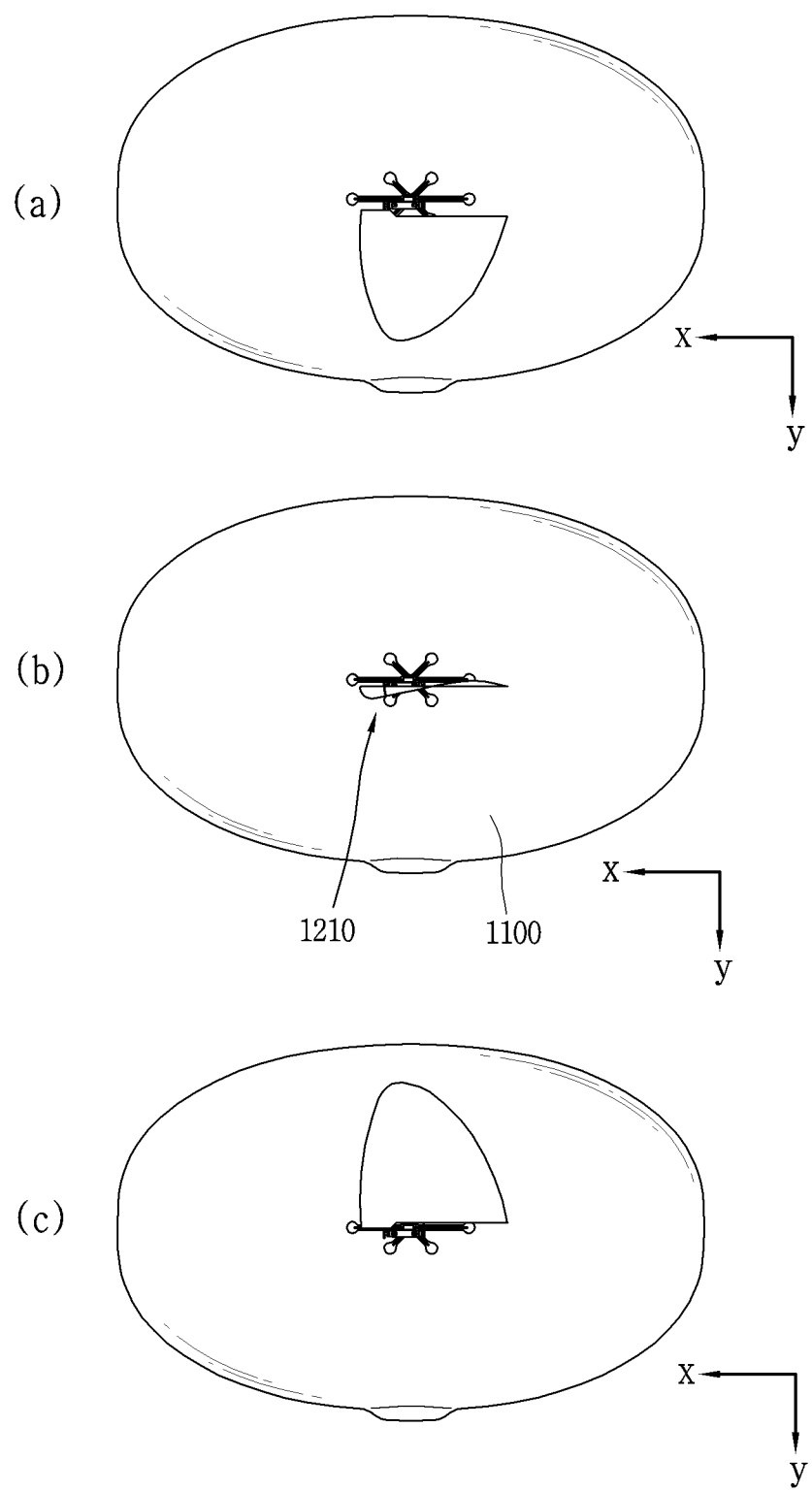

FIGS. 5A to 5C are conceptual views illustrating an operation of a wing part of an unmanned aerial vehicle which is moving forward. FIG. 5A is a conceptual view of the unmanned aerial vehicle viewed from one direction, FIG. 5B is a partially-enlarged view of the wing part of FIG. 5A, and FIG. 5C is a conceptual view of FIG. 5A viewed from a direction B.

Referring to FIG. 5A, the pair of wing parts 1200 are spread in a z-axial direction of the body part 1100 and are formed on regions of the body part 1100 opposite (corresponding) to each other. When viewed from the direction B, the third servomotor 1223 controls the fin portion 1210' to be horizontal to the x-axial direction. That is, one end of the first rib 1211 and one end of the second rib 1212 mounted on the first and second servomotors 1221 and 1222, respectively, are disposed on the x-axis.

Referring to FIG. 5C, the first and second ribs 1211 and 1212 are moved in the z-axial direction by the first and second servomotors 1221 and 1222 while having a phase difference therebetween. The end portion of the fin portion 1210' repetitively moves up and down with respect to the control unit 1224. Air above the ground where the body part 1000 floats moves from the front to the rear by a sequential movement of the first and second ribs 1211 and 1212 and the body part 1100 relatively moves forward, namely, in the x-axial direction in FIG. 5C.

Therefore, the forward, upward, and downward movements can be controlled based on the direction of the fin portion 1210' and the relative movement of the first and second ribs 1211 and 1212. Hereinafter, a method of controlling the unmanned aerial vehicle to fly backward will be described.

Figure 6A:
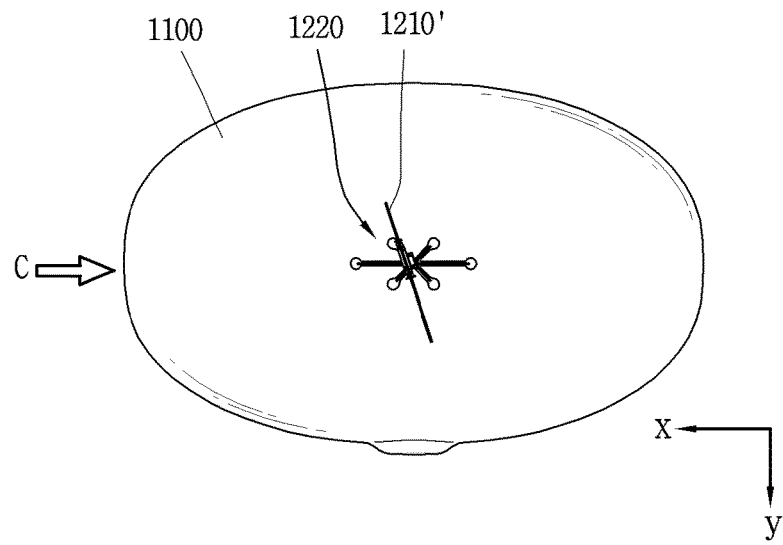
FIGS. 6A to 6C are conceptual views illustrating a backward movement of an unmanned aerial vehicle.
Figure 6B:
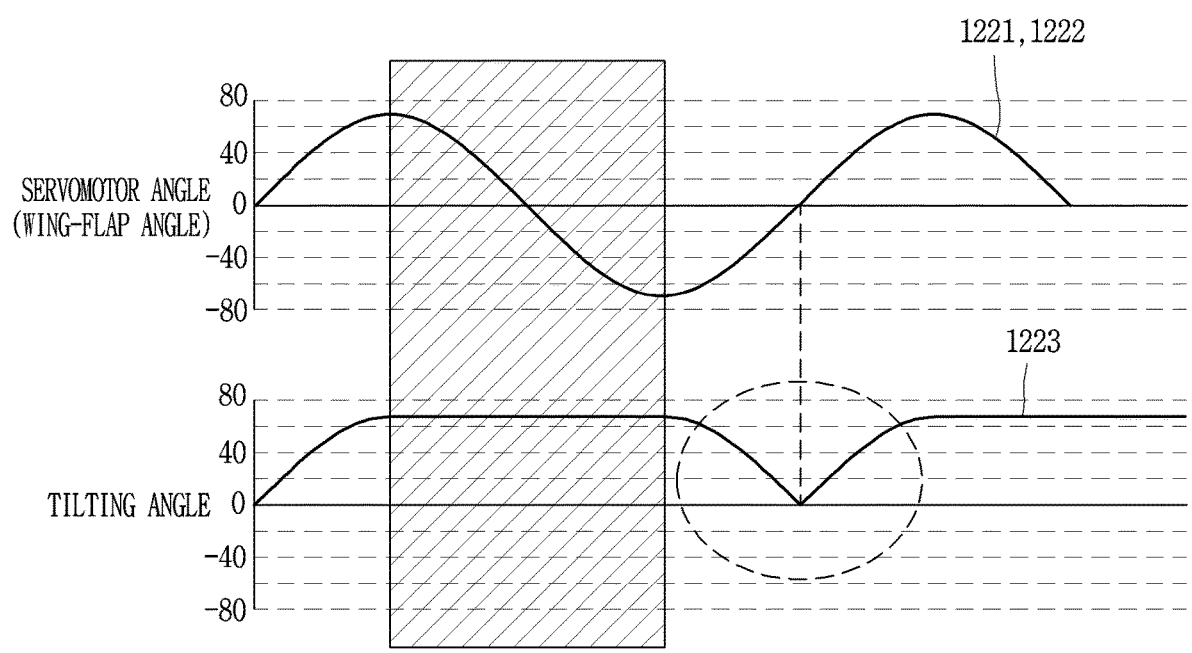

FIGS. 6A and 6B are conceptual views illustrating a backward movement of the unmanned aerial vehicle 1000.

In order to move the unmanned aerial vehicle 1000 backward, contact stress of the fin portion 1210' is used. Due to a rotation limit of the third servomotor 1223, the fin portion 1210' may not be arranged parallel to the y-axial direction.

The control unit removes the phase difference between the first and second servomotors 1221 and 1222 and controls the first and second ribs 1211 and 1212 to move together. Meanwhile, when the first and second ribs 1211 and 1212 move from a positive (+) peak point to a negative (−) peak point, the control unit 1224 controls the fin portion 1210' to form a maximum angle from the x-axis (here, the maximum angle is decided by the third servomotor 1223 and may be about 85°). On the other hand, when the first and second ribs 1211 and 1212 move from the negative peak point to the positive peak point, the control unit 1224 controls the fin portion 1210' to rotate. Accordingly, when the fin portion 1210' is located at the center of the body part 1100, the control unit 1224 controls the third servomotor 1223 such that the fin portion 1210' is disposed parallel to the x-axis. When the fin portion 1210' is parallel to the x-axis, the third servomotor 1223 rotates the fin portion 1210' to form a maximum angle with the x-axis. When the fin portion 1210' reaches the (+) peak point again, the fin portion 1210' rotates to form the maximum angle.

That is, when a phase shift direction of the first and second ribs 1211 and 1212 is a first direction, the control unit 1224 rotates the fin portion 1210' by a rotation limit angle of the third servomotor 1223. When the phase shift direction is a second direction opposite to the first direction, the control unit 1224 controls the fin portion 1210' to be maintained in parallel to the propelling direction.

The control unit 1224 may control a rotation speed to prevent a sudden rotation at a time point when it is positioned horizontally due to the rotation of the fin portion 1210'.

Accordingly, air moves due to the movement of the fin portion 1210' at the maximum angle, and when moving in an opposite direction, the propelling force is not generated by the rotation of the fin portion 1210'. Accordingly, the unmanned aerial vehicle 1000 can move backward.

Figure 6C:
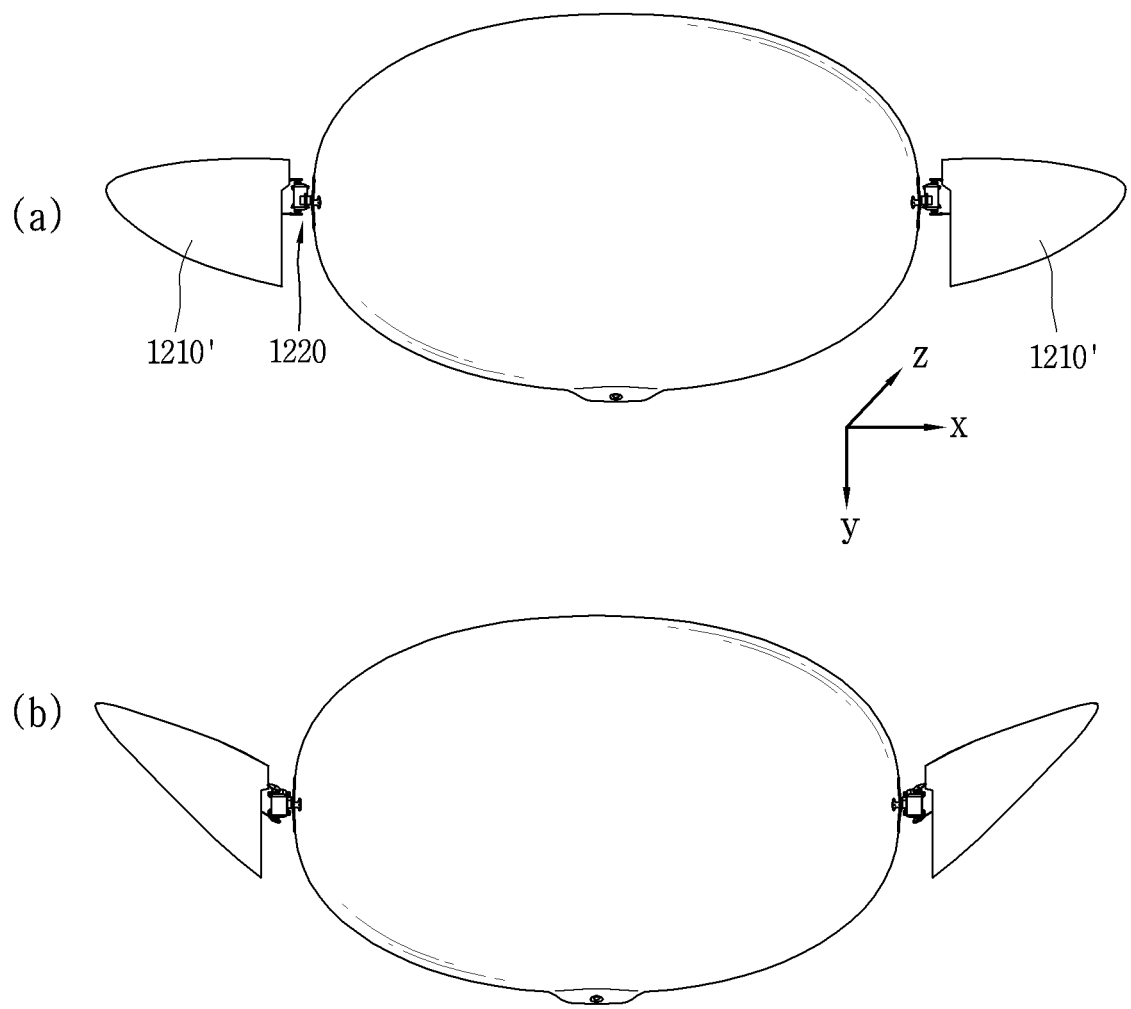

An angle at which the fin portion 1210' switches the rotating direction is not limited to 0 with respect to the x-axis. Referring to FIG. 6C, the wing part 1200 rotates close to the y-axial direction, and then is flapped by the first and second servomotors 1221 and 1222.

Figure 7A:
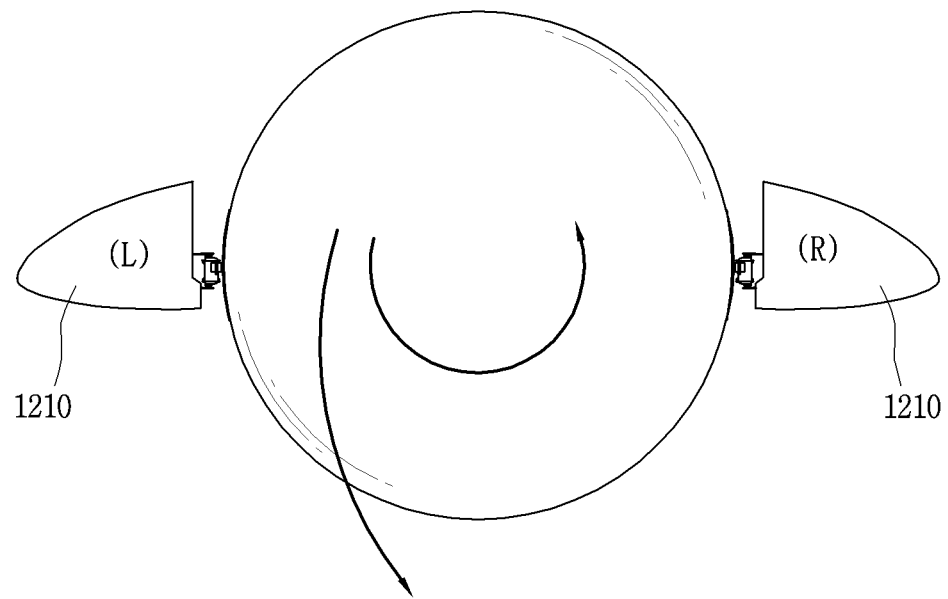
FIGS. 7A and 7B are conceptual views illustrating a rotation control method of an unmanned aerial vehicle.
Figure 7B:
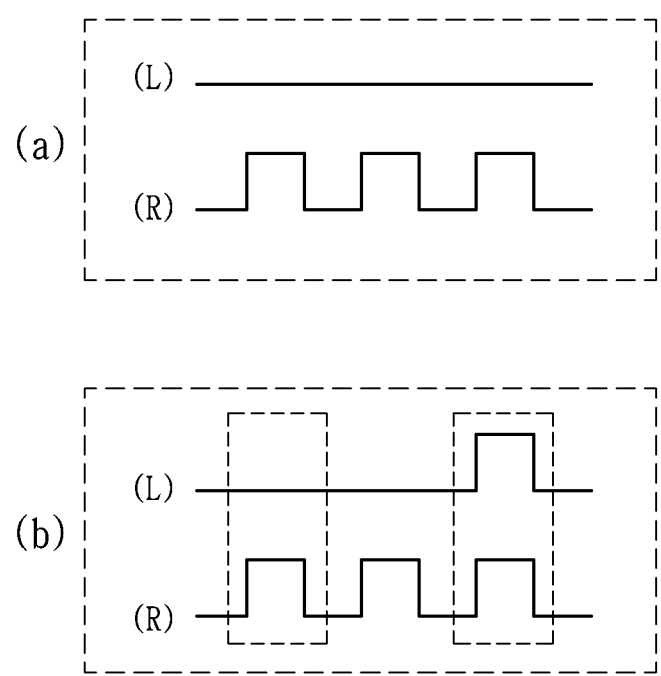

FIGS. 7A and 7B are conceptual views illustrating a method of controlling a rotation of an unmanned aerial vehicle. Hereinafter, a control method of rotating the unmanned aerial vehicle 100 to the left with reference to FIGS. 7A and 7B.

(a) of FIG. 7B is a graph showing the movement of the left and right wings during a sudden left turn. The control unit 1224 operates only the first and second servomotors 1221 and 1222 of the left (L) wing 1210 and restricts the operation of the right (R) wing 1210. Accordingly, the unmanned aerial vehicle 1000 turns to the left by a propelling force applied to the front of the left (L) wing 1210.

(b) of FIG. 7B is a graph showing the movement of the left and right wings during a gentle left turn. The control unit 1224 forms a movement pattern of the right (R) wing 1210 to be aligned with a movement pattern of the left (L) wing 1210. That is, the control unit 1224 controls the left and right wings 1210 in a manner that a wing-flap of the right wing 1210 corresponds to a wing-flap of the left wing (i.e., the operations of the first and second servomotors 1221 and 1222). The number of wing-flaps of the right wing 1210 is set to be smaller than the number of wing-flaps of the left wing 1210. The unmanned aerial vehicle 1000 moves forward by the wingbeats of the both wings 1210 and turns left when the wingbeats of only the left wing 1210 are made.

Meanwhile, referring to FIGS. 6A to 7A, the control unit 1224 may control the turn of the unmanned aerial vehicle 1000 by driving the both wings 1210 in different manners. For example, when the unmanned aerial vehicle turns in a left direction, the left (L) wing part is controlled to move forward, and the right (R) wing 1210 is controlled to move backward. The movement patterns of both of the wings 1210 should correspond to each other, and the body part 1100 rotates based on the movement toward the different directions. That is, the moving direction and motion of the unmanned aerial vehicle 1000 can be controlled by independently controlling the pair of wings disposed on both sides of the body part 1100.

Figure 8A:
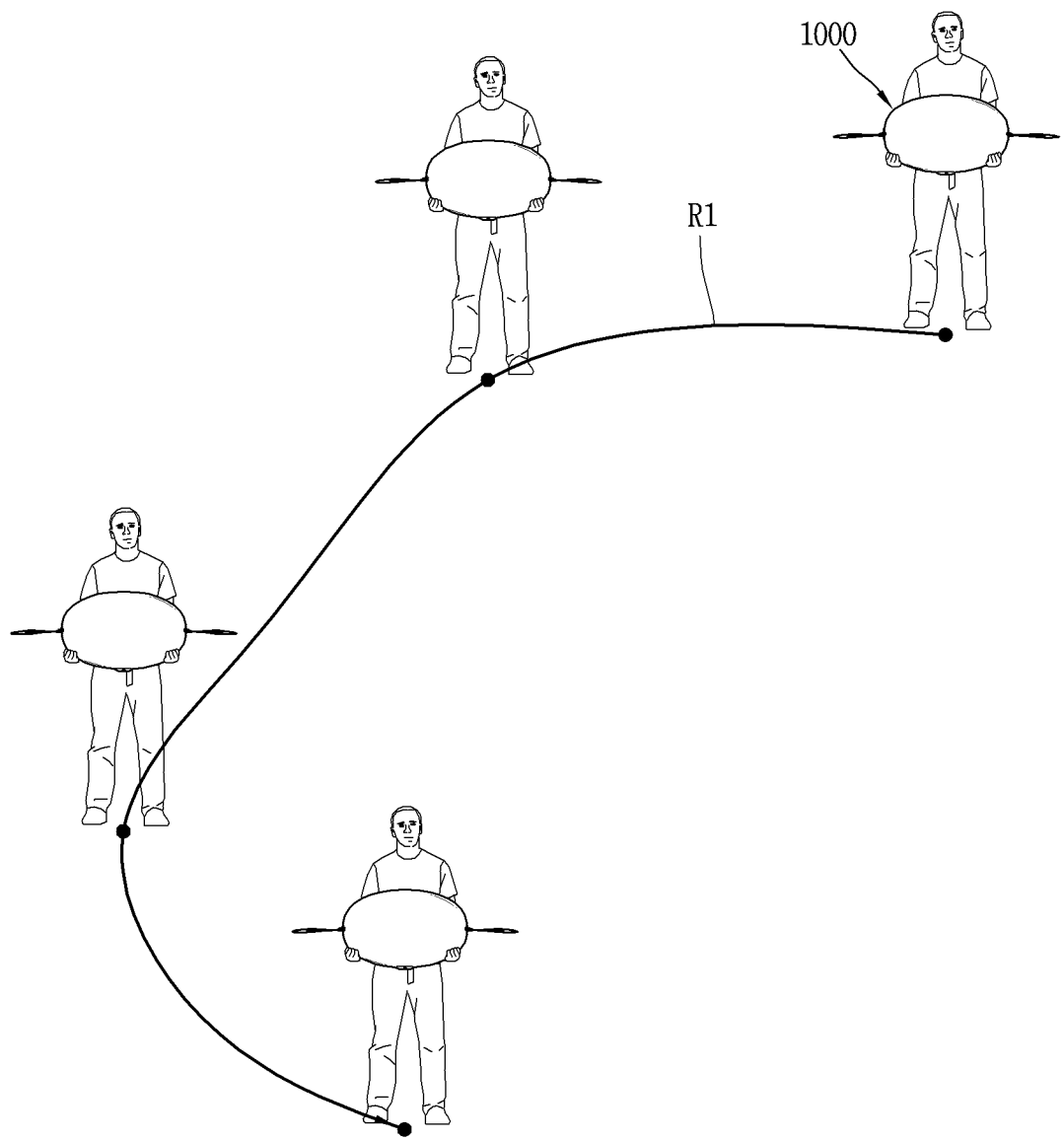
FIGS. 8A to 8C are conceptual views illustrating a control method of setting a route of an unmanned aerial vehicle.
Figure 8B:
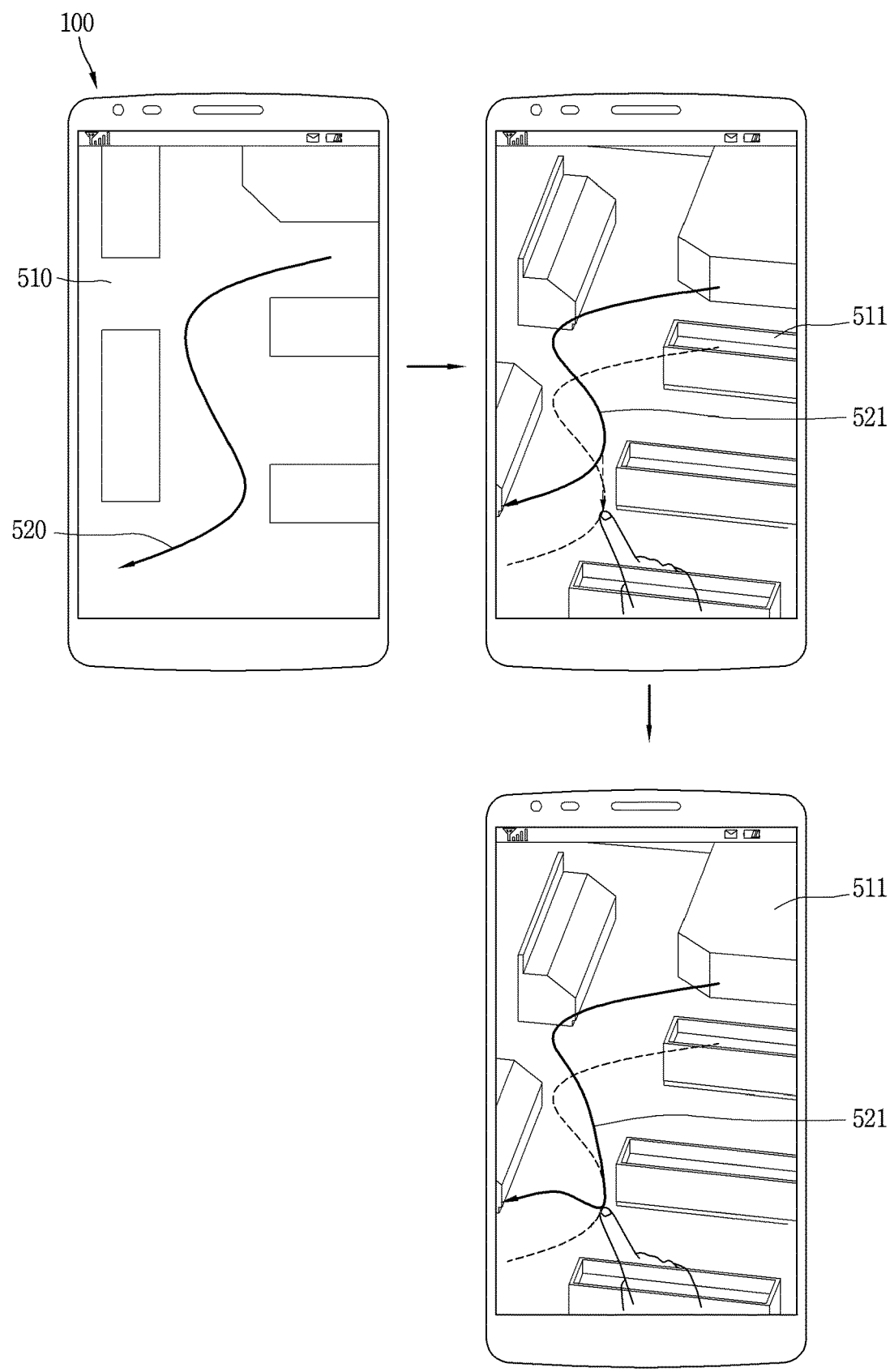
Figure 8C:
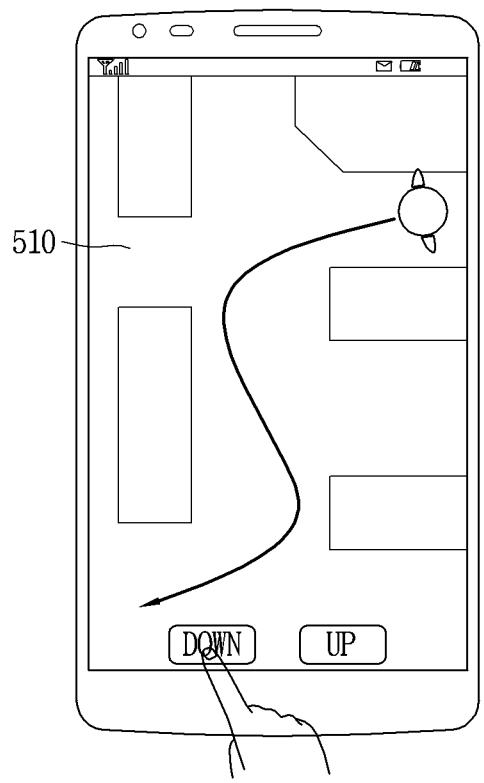
Figure 8C:
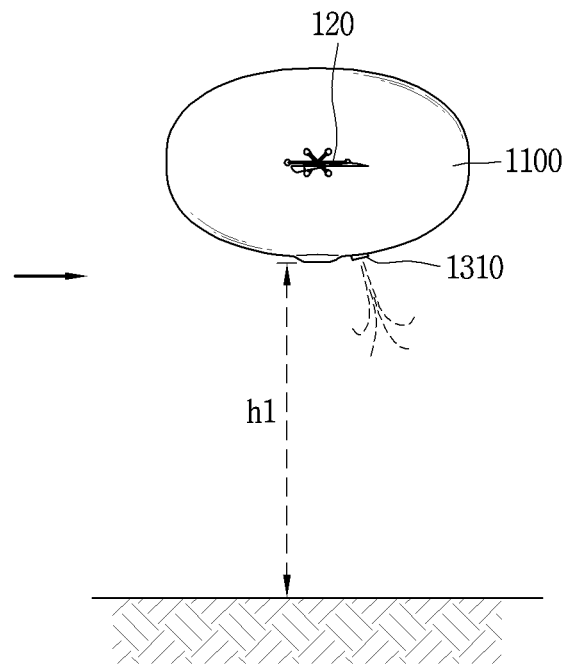
Figure 8C:
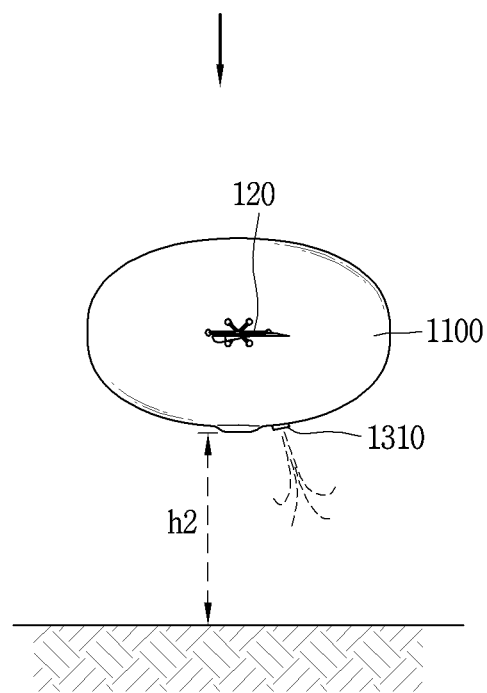

FIGS. 8A to 8C are conceptual views illustrating a control method of setting a route of an unmanned aerial vehicle.

Referring to FIGS. 8A and 8B, the unmanned aerial vehicle 1000 according to this embodiment may include a location information module. A module for acquiring the position of the unmanned aerial vehicle may be a GPS (Global Positioning System) module or a WiFi (Wireless Fidelity) module. For example, when the unmanned aerial vehicle uses the GPS module, the position of the unmanned aerial vehicle may be acquired using a signal sent from a GPS satellite. As another example, when the unmanned aerial vehicle uses the Wi-Fi module, the position of the unmanned aerial vehicle may be acquired based on information related to a wireless access point (AP) which transmits or receives a wireless signal to or from the Wi-Fi module. The location information module 115 is a module used for acquiring the position (or the current position) of the unmanned aerial vehicle, and is not limited to a module for directly calculating or acquiring the position of the unmanned aerial vehicle.

Or the unmanned aerial vehicle 1000 includes an inertial measurement unit (IMU). The IMU may sense a change in the position of the unmanned aerial vehicle 1000 by measuring a change in acceleration while the unmanned aerial vehicle 1000 moves. A flight region and a flight height of the unmanned aerial vehicle 1000 may be set based on a movement position of the unmanned aerial vehicle 1000.

The location information module senses a route R1 while the user holds the unmanned aerial vehicle 1000 and stores the route R1 in a memory or the like. The unmanned aerial vehicle 1000 may transmit information related to the route R1 to a specific server. Since the route R1 is set by the user, height information may not be included.

Referring to FIG. 8B, the unmanned aerial vehicle 1000 may transmit the route information to a terminal 100 performing wireless communication. The terminal 100 integrates the position information and the route (R1) information of the unmanned aerial vehicle 1000 which is flying and outputs a first flight route screen 510. The first flight route screen 510 corresponds to a planar view, and includes a first route image 520 indicating the route R1. When a specific control command is applied to the terminal 100, a second flight route screen 511 including height information related to a surrounding environment is output. The information related to the route R1 is output as a route image 521.

A controller of the terminal 100 may change height information related to the second route image 521 based on a touch applied to the second route image 521 on a display unit. The height of the flight route may be increased or decreased by the touch applied to the second route image 521. The flight route modified by the touch input may be received by the unmanned aerial vehicle 1000.

As the height of the flight route of one region is changed in the drawing, the unmanned aerial vehicle 1000 which is flying may fly down toward the ground and then fly upward again.

Referring to FIG. 8C, the unmanned aerial vehicle 1000 may transmit the route (R1) information to the terminal 100 that performs wireless communication. The terminal 100 integrates the position information and the route information related to the unmanned aerial vehicle 1000 which is flying and outputs a flight route screen 511.

When the flight route screen 511 is displayed on the display unit of the terminal 100, the display unit may output an icon for controlling a flight height of the unmanned aerial vehicle 1000. The unmanned aerial vehicle 1000 may control the wing parts 1200 based on a control command received by the terminal 100.

Meanwhile, the unmanned aerial vehicle 1000 according to this embodiment may further include a valve 1310 for discharging gas contained therein to adjust the height. When the valve 1310 is opened, the gas contained in the inside of the unmanned aerial vehicle 1000 is discharged and instead air is introduced into the unmanned aerial vehicle 1000. Accordingly, the unmanned aerial vehicle 100 becomes heavy. This may result in adjusting the flight height of the unmanned aerial vehicle 1000.

The valve 1310 of the unmanned aerial vehicle 1000 is opened when a control command for lowering the height is received from the terminal 100 while the unmanned aerial vehicle 1000 is floating at a first height h1. When the gas is discharged and air is introduced by the valve 1310, the heavy unmanned aerial vehicle 1000 may float at a second height h2 which is lower than the first height h1. In addition, the controller of the unmanned aerial vehicle 1000 may discharge the gas contained in the body part 1100 to control the unmanned aerial vehicle 1000 to stably land on the ground. The controller of the unmanned aerial vehicle 1000 can discharge the gas to the outside by a preset amount such that the unmanned aerial vehicle 1000 can gradually fly down to the ground by its own weight. Therefore, there is no need to apply an external force or an additional driving force to the unmanned aerial vehicle 1000 which flies in the air.

The second height h2 may correspond to a height set to a default even if the wing part 1200 does not generate a propelling force.

Alternatively, the controller of the unmanned aerial vehicle 1000 may block wireless communication with an external device or the like that transmits a control command, or may control the valve 1310 to lower the height of the unmanned aerial vehicle 1000 when a wireless communication state is not good. In this case, the controller preferably controls the unmanned aerial vehicle to discharge the gas until it lands on the ground.

Although it is merely shown in the drawing to set the flight route, the controller may provide in real time the flight route of the unmanned aerial vehicle to the terminal which performs wireless communication with the unmanned aerial vehicle 1000. In addition, the flight route of the unmanned aerial vehicle may be changed in real time through the terminal.

Although not shown specifically in the drawing, the unmanned aerial vehicle 1000 may include an air accommodating portion and a pneumatic pump. The controller of the unmanned aerial vehicle 1000 may control the pneumatic pump to inject air into the air accommodating portion to lower the height. The body part 1100 includes an additional accommodating portion for accommodating air introduced by the pneumatic pump. When air is introduced into the additional accommodating portion by the pneumatic pump, the weight of the body part 1100 becomes heavy, and the flight height of the unmanned aerial vehicle 1000 is lowered.

Figure 9A:
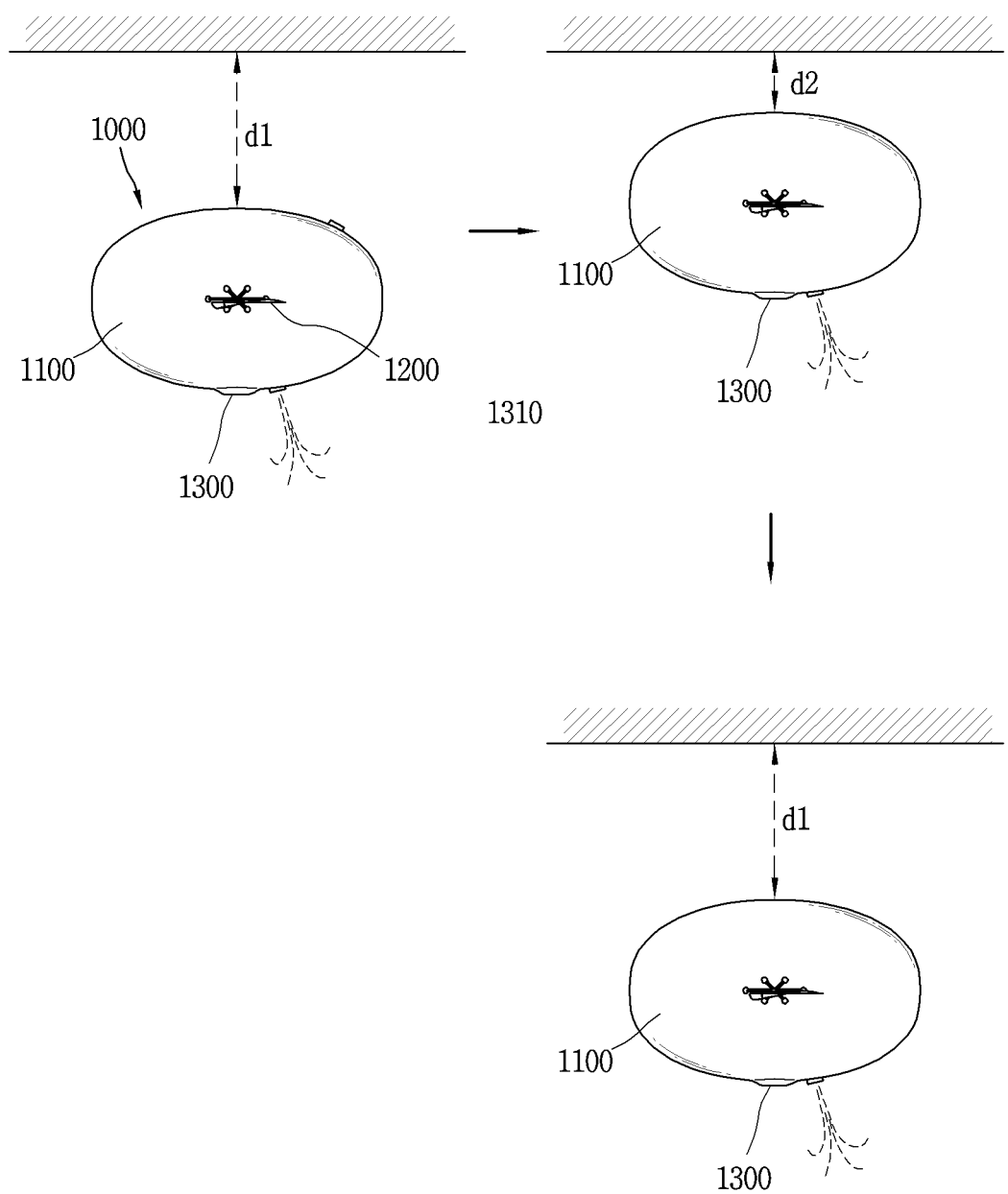
FIGS. 9A to 9C are conceptual views illustrating a method of controlling an unmanned aerial vehicle which is being flying.
Figure 9B:
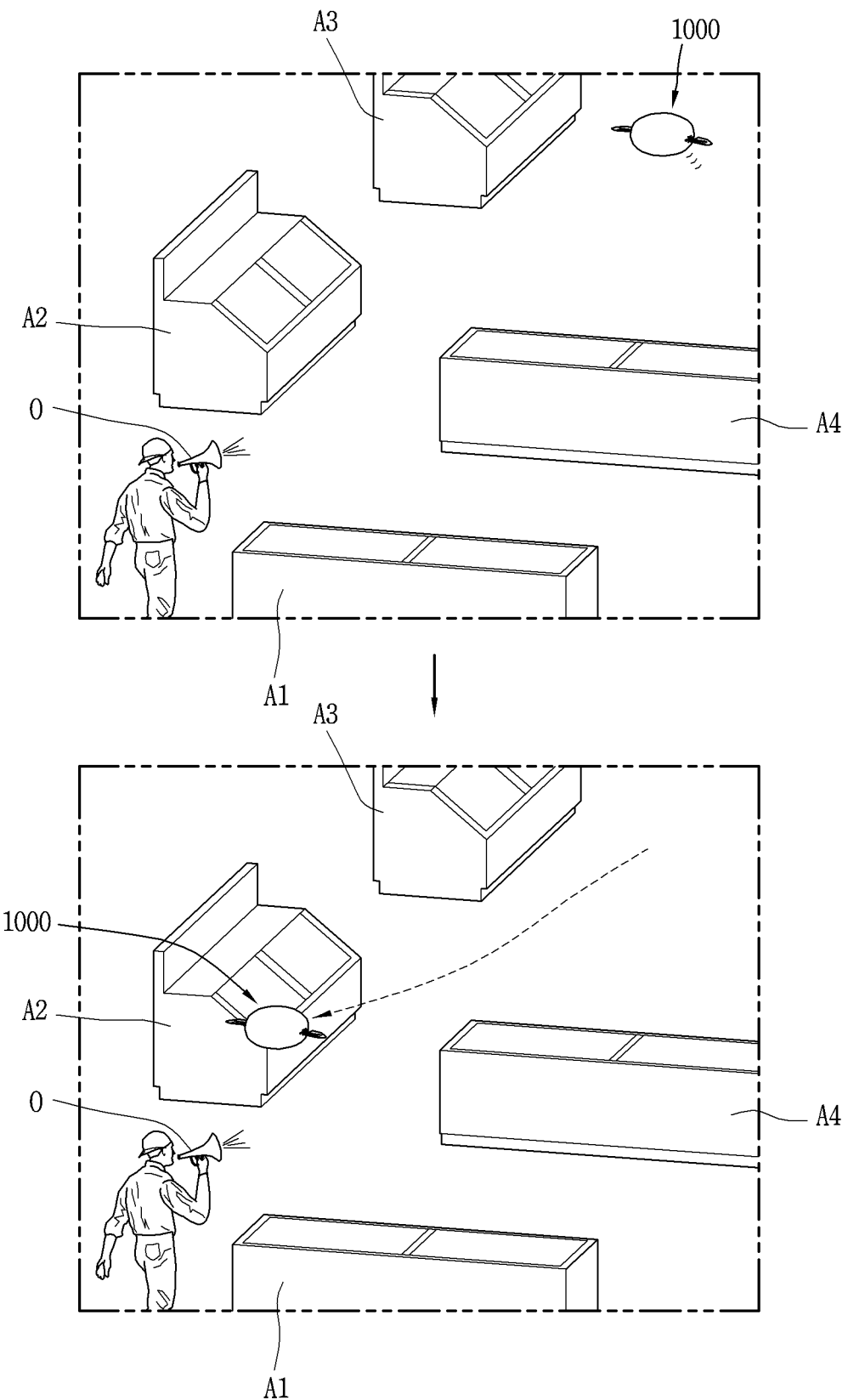
Figure 9C:
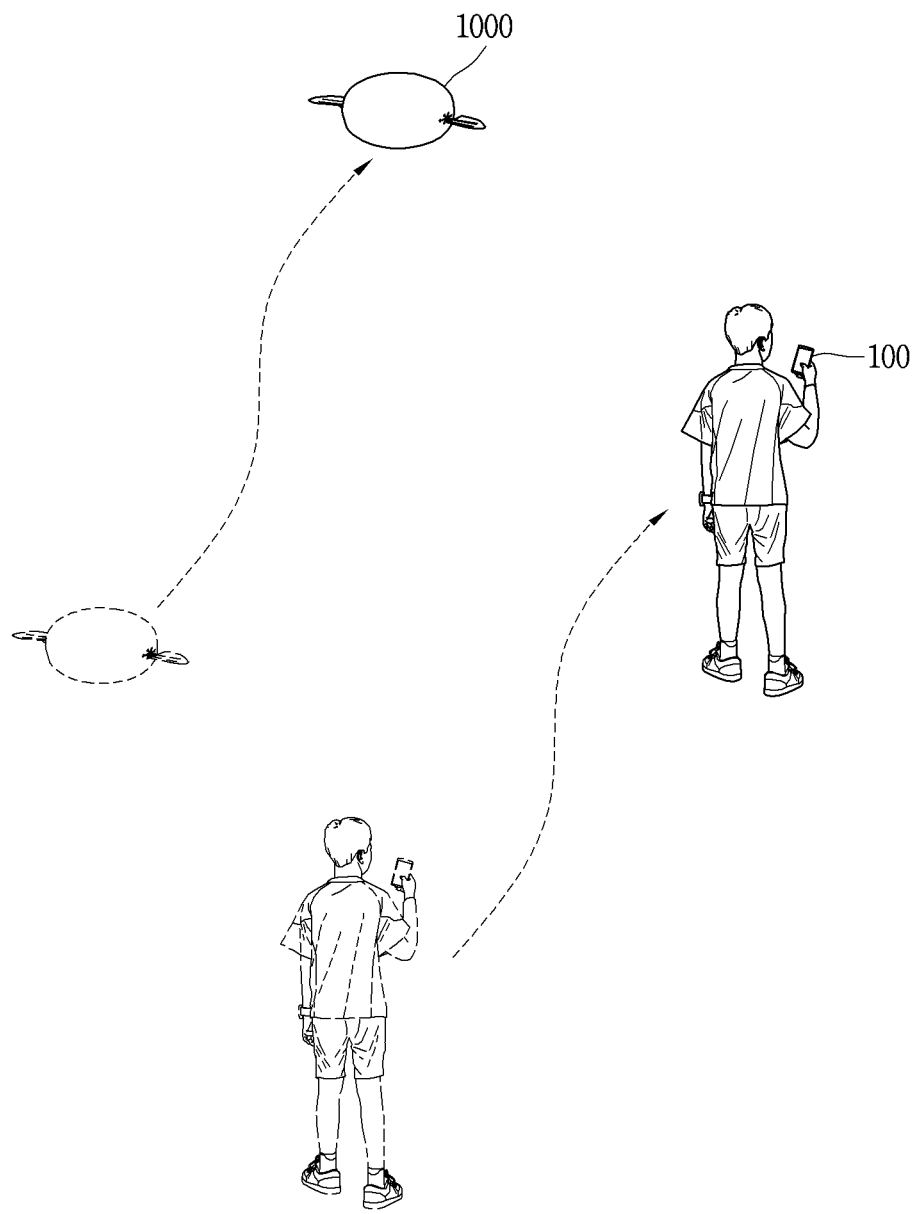

FIGS. 9A to 9C are conceptual views illustrating a method of controlling an unmanned aerial vehicle which is being flying.

The unmanned aerial vehicle according to this embodiment may include a distance sensor disposed on one region of the body part 1100. For example, the distance sensor may sense a distance to a ceiling. The distance sensor may be configured as an ultrasonic sensor.

Referring to FIG. 9A, the unmanned aerial vehicle 1000 floating in the air may be controlled to maintain a preset distance d1 from the ceiling. The distance from the ceiling may be set by an amount of gas filled in the unmanned aerial vehicle 1000 or may be maintained by the wingbeats of the wing part 1200.

The distance between the unmanned aerial vehicle 1000 and the ceiling may be changed by an external force. Here, the external force may be the wind blowing from the outside or a collision with another object (person). When the distance sensor senses that the distance between the unmanned aerial vehicle 1000 and the ceiling is reduced shorter than the distance d1, the controller of the unmanned aerial vehicle 1000 generates a control command for lowering the height of the unmanned aerial vehicle 1000.

For example, the controller may open the valve 1310 to control the discharge of the gas contained in the body part 1100. The controller controls the valve to be closed when the distance from the ceiling sensed by the distance sensor is the preset distance d1.

Although not shown in the drawings, the controller may control the wing part 1200 so that the unmanned aerial vehicle 1000 flies downward while moving in one direction. The controller of the unmanned aerial vehicle 1000 may control the motor unit 1220 to improve the propelling force of the wing part 1200 when a moving speed of the wing part 1200 is reduced due to an external force while the wing part 1200 is operating.

In addition, when the distance sensor is disposed on a side surface of the body part 1100 of the unmanned aerial vehicle 1000, the controller may control the wing part 1200 to be spaced apart from an external object if the unmanned aerial vehicle 1000 approaches the external object within a preset danger distance.

Referring to FIG. 9B, a wireless access point (AP) may be disposed at each specific position in a room. For example, first to fourth APs A1, A2, A3, and A4 may be set. When the unmanned aerial vehicle 1000 approaches, a wireless signal related to this is received. For example, when an external device 0 performing wireless communication with the unmanned aerial vehicle 1000 transmits information related to the point A2 which the external device approaches, the unmanned aerial vehicle 1000 may move to be close to the point A2 indicated by the received information.

For example, when a user having the external device is located in a specific area of an indoor space, the external device may transmit information related to a nearby point to the unmanned aerial vehicle 1000 to control the movement of the unmanned aerial vehicle 1000.

In this case, the controller of the unmanned aerial vehicle 1000 may control the electronic module part 1300 to perform photographing by a camera or output auditory data by a speaker.

Alternatively, when information related to each of the first to fourth points A1, A2, A3 and A4 is received during the flight of the unmanned aerial vehicle 1000, then the controller may perform a different control. For example, the controller may control the electronic module part 1300 to activate the camera or to output auditory information through a speaker based on different information.

Referring to FIG. 9C, the unmanned aerial vehicle according to the present embodiment may include a UWB module. The UWB module receives a UWB packet from an external tag. The tag transmits UWB packets to the unmanned aerial vehicle 1000 with a preset period. In this case, the tag 100 may transmit the motion information together with the UWB packet to the unmanned aerial vehicle 1000. When receiving a plurality of UWB packets, a distance between the unmanned aerial vehicle 1000 and the tag 100 may be measured. The distance may be measured by the controller of the unmanned aerial vehicle 1000 or a controller of the tag 100.

The unmanned aerial vehicle 1000 may fly in a manner of maintaining a predetermined distance from the tag 100 using the UWB packets and the distance to the tag 100. Accordingly, the user can control the unmanned aerial vehicle 1000 to fly while being positioned adjacent to the user as needed.

Figure 10:
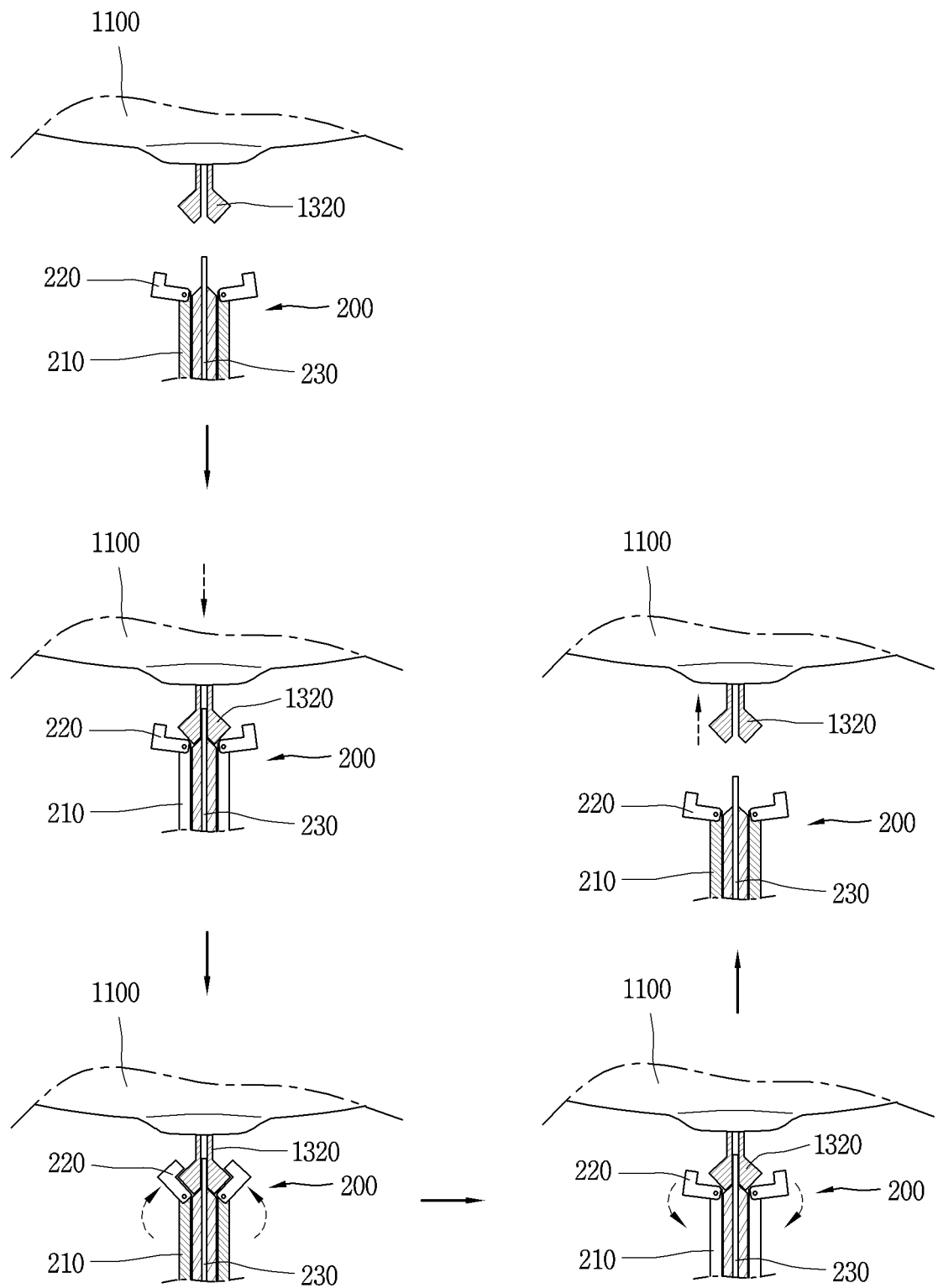
FIG. 10 is a conceptual view illustrating a method of charging an unmanned aerial vehicle.

FIG. 10 is a conceptual view illustrating a method of charging an unmanned aerial vehicle.

The inside of the body part 1100 is filled with helium gas or the like and is provided with a battery. The filled gas may be discharged by the valve 1310 (see FIG. 8C). Accordingly, the unmanned aerial vehicle 1000 according to the present invention includes a charging structure 1320 for charging the battery with power or for filling the gas. The charging structure 1320 is preferably disposed adjacent to the electronic module part 1300 but is not limited thereto.

A charging device 200 for charging electric power or gas of the unmanned aerial vehicle 1000 includes a main body 210 into which the charging structure 1320 is insertable, a connecting unit 220 coupled to the charging structure 1320 to charge the power or gas, and a fixing unit 230 for fixing the charging structure 1320. The charging structure 1320 has a shape protruding from the body part 1100.

When the unmanned aerial vehicle 1000 is adjacent to the charging device 200, the charging device 200 switches the fixing unit 230 to an open state. When the fixing unit 230 is switched to the open state, the charging structure 1320 is inserted into the main body 210. In order to mount the unmanned aerial vehicle 1000 on the charging device 200, the controller of the unmanned aerial vehicle 1000 may control the wing part 1200 such that the charging structure 1320 can move toward the charging device 200.

The charging structure 1320 and the main body 210 include magnets which attract each other. When the charging structure 1320 of the unmanned aerial vehicle 1000 is adjacent to the charging device 200, the charging structure 1320 is mounted on the main body 210 by a magnetic force of the magnets.

When the charging structure 1320 is inserted into the main body 210, the fixing unit 230 is switched to a fixed state. The fixing unit 230 includes a plurality of rotating structures having hinge portions. In the closed state, the plurality of rotating structures surrounds the fixing unit 230. An inner surface of the fixing unit 230 may have a shape corresponding to a shape of an outer surface of the charging structure 1320. When the fixing unit 230 is switched to the fixed state, the charging structure 1320 is prevented from being detached from the charging device 200. When the fixing unit 230 is switched to the fixed state, the charging device 200 may charge the gas or power by connecting the connecting unit 220 to one end portion of the charging structure 1320.

The charging device 200 switches the fixed state of the fixing unit 230 to the open state when the gas or power is fully charged. When switched to the open state, the charging structure 1320 may be separated from the charging device 2000 by the gas inside the body part 1000. Alternatively, the controller of the unmanned aerial vehicle 1000 may control the wing part 1200 such that the body part 1100 moves away from the charging device 200.

The controller of the unmanned aerial vehicle 1000 may sense an amount of power or gas of the battery and control the wing part 1200 to move toward the charging device 200 according to the sensing result, or perform a charging step based on a control command applied from the outside.

Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

INDUSTRIAL APPLICABILITY

The present invention relates to an unmanned aerial vehicle containing gas, and includes a structure for controlling the unmanned aerial vehicle to fly by a movement of a fin portion having a phase difference. Therefore, the present invention can be utilized in various related industrial fields.

The invention claimed is:

1. An unmanned aerial vehicle, comprising:
a body part having an inner space filled with light gas that allows the body part to float in the air; and
a plurality of wing parts mounted on the body part to provide a propelling force,
wherein each of the plurality of wing parts comprises:
a fin portion having first and second ribs mounted thereon;
first and second servomotors connected to one end of the first rib and one end of the second rib, respectively, to move another end of the first rib and another end of the second rib within a preset control angle range;
a control unit to control the first and second servomotors so that the first and second ribs move while having a predetermined phase difference therebetween; and
a third servomotor connected to the first and second servomotors to rotate the fin portion to decide a propelling direction of the body part.

2. The vehicle of claim 1, wherein the third servomotor rotates the fin portion to be horizontal to the propelling direction with respect to an axial direction which is a direction perpendicular to an outer surface of the body part.

3. The vehicle of claim 2, further comprising a fixed support unit mounted on the outer surface of the body part to fix the third servomotor.

4. The vehicle of claim 1, wherein the first and second servomotors are disposed on a left side and a right side of the control unit so as to maintain a preset interval therebetween.

5. The vehicle of claim 4, wherein the control unit controls the first and second servomotors to increase the control angle and shorten a motion period of the first and second ribs, in order to increase the propelling force.

6. The vehicle of claim 1, wherein the control unit rotates the fin portion by a limit angle of the third servomotor when a phase shift direction of the first and second ribs is a first direction, and controls the third servomotor such that the fin portion rotates in a direction horizontal to the propelling direction when the phase shift direction is a second direction opposite to the first direction.

7. The vehicle of claim 6, wherein the control unit controls the first and second servomotors so that a phase difference between the first and second ribs is not generated.

8. The vehicle of claim 1, wherein the plurality of wing parts includes a first wing part and a second wing part mounted on regions of the body part that are symmetrical to each other, and
wherein the unmanned aerial vehicle includes a controller to stop the first wing part and operate only the second wing part for rotation in one direction.

9. The vehicle of claim 1, wherein the plurality of wing parts includes a first wing part and a second wing part mounted on regions of the body part that are symmetrical to each other, and the unmanned aerial vehicle rotates by differently driving the first wing part and the second wing part,
wherein the first and second servomotors of the first wing part are controlled by the first wing part to generate the propelling force in a first direction, and
wherein the first to third servomotors of the second wing part are controlled by the second wing part to generate the propelling force in a second direction opposite to the first direction.

10. The vehicle of claim 1, further comprising an electronic module part disposed in one region of the body part, and configured as at least one of a camera, a battery, a controller, and a speaker.

11. The vehicle of claim 10, wherein an activation or deactivation of at least one of the camera and the speaker is controlled by an operation of the plurality of wing parts.

12. The vehicle of claim 1, further comprising a sensor unit provided with at least one of a distance sensor for detecting a distance to an external object, an inertial measurement unit (IMU) sensor for detecting a movement, and a position sensor for detecting a position of the body part.

13. The vehicle of claim 12, further comprising:
a wireless communication unit to perform wireless communication with an external device; and
a controller to set a flight route based on a route sensed by the sensor unit according to the movement of the body part,
wherein the controller transmits the route to the external device and changes the flight route of the body part based on height information received from the external device.

14. The vehicle of claim 13, wherein the controller sets a flight region of the unmanned aerial vehicle based on the route.

15. The vehicle of claim 12, further comprising a controller to control the wing part to move the body part when the sensor unit senses that the body part is out of a preset position.

16. The vehicle of claim 15, wherein the body part includes a valve by which the light gas is discharged, and
wherein the controller controls opening and closing of the valve to change the flight height of the body part.

17. The vehicle of claim 1, further comprising a charging structure to fill the light gas or charge power of a battery mounted in the body part,
wherein the charging structure further comprises a magnet to generate an attractive force such that the charging structure is in contact with a charging device.

18. The vehicle of claim 17, wherein the charging structure is fixed to the charging device by a fixing unit of the charging device while the charging is performed, and released by the fixing unit when the charging is completed so as to be separated from the charging device based on buoyancy by the light gas.

19. The vehicle of claim 1, wherein the plurality of wing parts includes a first wing part and a second wing part mounted on regions of the body part that are symmetrical to each other, and
wherein control units of the first and second wing parts control the first and second servomotors of the first wing part and the first and second servomotors of the second wing part, respectively, so that a number of wing flaps of the first wing part is smaller than a number of wing flaps of the second wing part.

* * * * *